United States Patent [19]

Inooka

[11] Patent Number: 4,525,267
[45] Date of Patent: Jun. 25, 1985

[54] PROCESS FOR HYDROCRACKING HYDROCARBONS WITH HYDROTREATMENT-REGENERATION OF SPENT CATALYST

[75] Inventor: Masayoshi Inooka, Yokohama, Japan

[73] Assignee: Chiyoda Chemical Engineering & Construction Co., Ltd., Yokohama, Japan

[21] Appl. No.: 432,942

[22] PCT Filed: Jun. 9, 1981

[86] PCT No.: PCT/JP81/00134
§ 371 Date: Sep. 23, 1982
§ 102(e) Date: Sep. 23, 1982

[87] PCT Pub. No.: WO82/04441
PCT Pub. Date: Dec. 23, 1982

[51] Int. Cl.$^3$ .............. C10G 47/30; C10G 65/12; B01J 23/94; B01J 23/92
[52] U.S. Cl. .................. 208/58; 208/110; 208/111; 208/112; 502/5; 502/21; 502/30; 502/31; 502/516
[58] Field of Search .......... 208/111, 58; 252/414, 252/411 R; 502/5, 21, 30, 31, 516

[56] References Cited

U.S. PATENT DOCUMENTS

| | | | |
|---|---|---|---|
| 2,764,528 | 9/1956 | Sweeney | 502/30 |
| 2,775,607 | 12/1956 | Köbel et al. | 252/414 |
| 3,113,097 | 12/1963 | White et al. | 208/255 |
| 3,158,563 | 11/1964 | Strecker | 252/414 X |
| 3,336,238 | 8/1967 | Gatsis | 252/411 |
| 3,376,218 | 4/1968 | Menzl et al. | 502/30 |
| 3,389,077 | 6/1968 | Gleim et al. | 208/264 |
| 3,393,145 | 7/1968 | Dill et al. | 208/59 |
| 3,870,624 | 3/1975 | Tice et al. | 208/143 |
| 4,073,721 | 2/1978 | Kanbier et al. | 252/414 |
| 4,163,707 | 8/1979 | Goudriaan et al. | 208/111 |
| 4,359,379 | 4/1982 | Ushio et al. | 252/411 R |

FOREIGN PATENT DOCUMENTS

| | | | |
|---|---|---|---|
| 342114 | 1/1956 | Japan. | |
| 375165 | 8/1959 | Japan. | |
| 45-32063 | 10/1970 | Japan. | |
| 46-11101 | 3/1971 | Japan. | |
| 51-47675 | 12/1976 | Japan. | |
| 56-70840 | 6/1981 | Japan | 502/30 |

OTHER PUBLICATIONS

Chemical Abstracts-vol. 95-1981; 135649a.

Primary Examiner—P. E. Konopka
Attorney, Agent, or Firm—Armstrong, Nikaido, Marmelstein & Kubovcik

[57] ABSTRACT

A process for hydrocracking hydrocarbons for residuum conversion in the presence of a fluidized catalyst, which is characterized by extracting at least part of the fluidized catalyst from the reaction system as a spent catalyst, subjecting at least part of the spent catalyst to hydrotreatment for solubilizing toluene-insoluble carbonaceous materials deposited on the catalyst thereby regenerating the spent catalyst, and recycling the regenerated catalyst to the hydrocracking step. According to this process, the spent catalyst is recycled to the hydrocracking step in a highly activated state after the regenerative hydrotreatment, so that it becomes possible to suppress the coke production within the reactor to a considerable degree, to maintain the coke level of the catalyst below a predetermined value and to preclude the contamination of the reactor walls with coke. The process of the invention which regenerates the spent catalyst by a hydrotreatment, in contrast to the conventional catalyst regeneration by oxidative roasting, eliminates all the difficult problems as encountered in the oxidative roasting methods.

24 Claims, 14 Drawing Figures

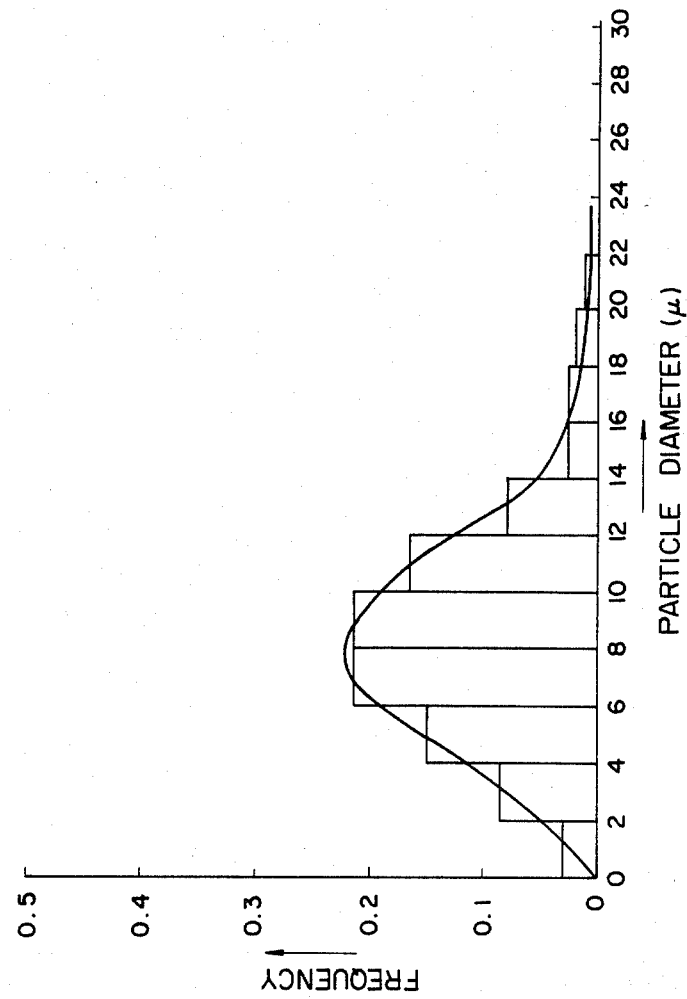

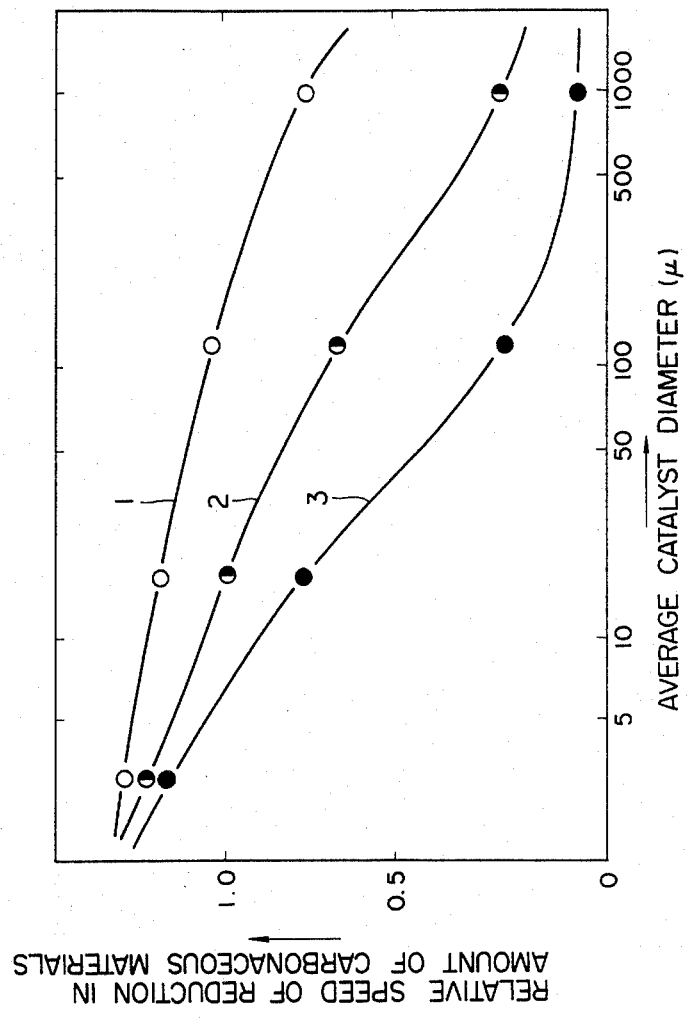

PROCESS FOR HYDROCRACKING HYDROCARBONS WITH HYDROTREATMENT-REGENERATION OF SPENT CATALYST

TECHNICAL FIELD

This invention relates to a process for the catalytic hydrocracking of hydrocarbons, and more particularly to a process for the hydrotreatment of hydrocarbons in the presence of a catalyst, which is capable of efficiently hydrocracking hydrocarbons while maintaining the coke level on the catalyst below a predetermined level. The process of the present invention is advantageously applicable to the hydrocracking of hydrocarbons such as crude oils, various heavy oils which are derived from crude oils, liquefied coal oil, and pitch or the like which is derived from petroleum or coal.

BACKGROUND ART

For the purpose of cracking hetero-atom compounds, asphaltenes and residual carbon precursors which are contained in hydrocarbons or for changing their properties or compositions, the hydrotreatment of hydrocarbons in the presence of a catalyst has been in wide use in the art. To this end, catalysts of diversified properties and compositions are used, depending upon the nature of the feed oil, the purpose of the treatment or the reaction conditions. As a matter of course, the catalyst which is used for the hydrocracking treatment deteriorates as the reaction proceeds. The causes of deterioration which are common to almost all of the hydrotreatment catalysts include the deposition of carbonaceous materials on the catalysts in addition to the influences of the contaminants such as metals and sulfur components which are contained in the feed oil. The mechanism of the deposition of the carbonaceous materials on the catalyst or the structure and composition of the deposited carbonaceous materials are hardly known except the fact that the deposition occurs in a relatively large amount when a catalyst with a higher solid acid content, that is to say, with a low hydrogenation power, is used under high temperature and low hydrogen pressure conditions. For instance, the deposition of carbonaceous materials is as low as 10% by weight of the catalyst in the treatment of a feed oil free of a residual oil but it exceeds 40-50 wt % and in some cases deposition in excess of 200 wt % is experienced in the treatment of residual oils. The catalyst which has been deteriorated by the deposition of carbonaceous materials is usually used again after regeneration of the catalyst by the removal of the carbonaceous materials, in some cases, recovering the deposited metals after removal of the carbonaceous materials. However, these methods are not advantageous technically.

The hydrocracking of hydrocarbons, especially, of heavy hydrocarbons, requiring a high reaction temperature, inherently involves a problem that the catalyst is deteriorated within a short time period due to the increased deposition of carbonaceous materials on the catalyst. Therefore, it becomes necessary to replace or regenerate the catalyst frequently. With regard to the replacement or regeneration of the catalyst in the reaction system, there have thus far been proposed various methods. The representatives of them are the methods using fluidized catalyst such as Varga process, slurry-catalyst process and suspension-catalyst process which are widely practiced by virtue of many advantages resulting from the use of a fluidized catalyst of finely divided solid particles. The advantages which accrue from the use of a catalyst in the form of fluidized finely particulate solid particles include:

(1) The catalyst is freely movable within the reactor and the catalyst which has been deteriorated due to coking or metal deposition can be withdrawn along with the product oil, so that the reactor is less susceptible to blocking and it is possible to carry out the treatment under a lower hydrogen pressure and at a higher temperature as compared with other methods;

(2) Consequently, the chemical hydrogen consumption as well as the equipment cost is reduced;

(3) The catalyst which is in the form of fine particles is free of the influences on its activity of the average pore diameter or other factors of its physical structure, and almost immune from the catalytic deterioration owing to metal deposition; and (4) An extremely broad range of catalysts are applicable, including such a cheap catalyst as a ground, degenerate catalyst after use in the conventional fixed bed.

However, notwithstanding the foregoing advantages, the use of finely particulate catalyst still has problems to be solved, as follows.

(1) An extremely large amount of catalyst is consumed since it is not regenerated partly because of its cheapness and the difficulties of its regeneration. Therefore, in spite of the cheapness, there arises a problem of a large expense required for the catalyst even in the treatment of feedstock oils of lower grade;

(2) The discard of the spent catalyst brings about a new problem of environmental pollution due to the heavy metals deposited thereon;

(3) Even if, in order to solve the foregoing problems, the spent catalyst is separated from the product oil for reuse, the activity of the catalyst is considerably deteriorated due to a large quantity of coke deposition on the catalyst. Further, the catalyst is apt to cohere, resulting in the precipitation within the reactor or clogging of the reactor;

(4) Considerable difficulties are practically involved in the separation of the finely particulate catalyst from the product oil;

(5) When the catalyst separated from the product oil is subjected to oxidative roasting for reuse, the recovery of the catalyst is difficult due to cohesion or fusion of the individual particles during the roasting treatment, and the workability is extremely poor.

In an attempt to solve the above-mentioned problems which are encountered in the hydrocracking of hydrocarbons with the use of a dispersed or suspended microparticulate solid catalyst (hereinafter referred to as "slurry catalyst" for brevity), there have thus far been made various proposals in the art. U.S. Pat. Nos. 3,622,495 and 3,622,498 disclose a process for converting a heavy oil with high asphaltene and vanadium contents into a light oil with reduced asphaltene and vanadium contents through a hydrotreatment using a micro-particulate vanadium sulfide catalyst, in which the product oil is separated into light and heavy fractions, and the catalyst-containing heavy fraction is recycled to the step of the hydrotreatment. According to this process, it is possible to obtain a light oil substantially free of asphaltenes by the use of the highly active catalyst. However, it necessitates to extract a large quantity of heavy oil which contains the spent catalyst and to add fresh catalyst in supplement therefor since the catalyst is deteriorated by the cyclic use. With regard to the cyclic use of such vanadium sulfide catalyst, U.S. Pat. Nos. 3,645,912 and 3,635,838 describe a process for removing carbonaceous materials and contaminant metals from the catalyst to be recycled, in which the spent catalyst is subjected to reaction with elementary sulfur at 500°–1000° C. thereby removing the carbonaceous materials as carbon bisulfide before eliminating the metals with use of a mineral acid. This process has an advantage in that the vanadium sulfide can be regenerated into vanadium tetrasulfide in the regenerative step to serve as a catalyst with high activity, but involves the problems as encountered in the oxidative treatment of a spent catalyst to be recycled.

Japanese Laid-Open Patent Specification No. 53-78203 discloses a hydrotreatment process using as a catalyst a pulverized, spent catalyst from a fixed bed type hydrotreatment system, in which the catalyst is separated from the product oil for recycling after regeneration by roasting. Because of the inclusion of the step of oxidative roasting, this process also fails to solve the problems in the slurry-catalyst process as mentioned hereinbefore. In this connection, Japanese Patent Publication No. 49-16522 and Japanese Laid-Open Patent Specification Nos. 55-16188, 55-131094 and 55-161885 disclose a process employing a combination of a primary hydrotreatment step using a slurry catalyst and a secondary hydrotreatment step using an ebullated catalyst bed or a fixed catalyst bed. Such a process can eliminate at least part of the drawbacks of the hydrotreatment using an ebullated or fixed catalyst bed but gives no consideration to the solution of the problems connected with the cyclic use of the slurry catalyst.

As another hydrotreatment method using the fluidized catalyst, there is employed an ebullated bed of a particulate catalyst. This method uses a catalyst of a larger particle size as compared with the above-mentioned slurry-catalyst process so that it is distinguished from the latter process in that it permits easier separation of the catalyst from the product oil. However, it resembles the slurry-catalyst process in that the catalyst which is dispersed in fluidized state in the hydrocarbon oil can be treated under high temperature and low hydrogen pressure conditions and that continuous extraction or replacement of the catalyst is possible. Nevertheless, the ebullated bed process also involves a number of difficult problems for the regeneration of the spent catalyst. More specifically, neither the solvent-washing method nor the oxidative roasting method which is usually resorted to for the regeneration of the ebullated bed catalyst is satisfactory. For example, the solvent-washing method has the following drawbacks.

(1) Only part (oil-soluble components) of the carbonaceous materials deposited on the catalyst is removed in the washing step;

(2) It is very difficult to remove by a normal washing operation the carbonaceous materials which have accumulated in the catalyst in a large amount; and (3) Complete recovery of the solvent used in the washing operation is difficult.

On the other hand, the oxidative roasting which permits efficient removal of the carbonaceous material also has a number of problems, as follows:

(1) The oxidative roasting cannot be carried out in the reactor and requires the transfer of the spent catalyst. However, such transfer involves a considerable technical difficulty in handling the spent catalyst which is in reduced state and thus very susceptible to oxidation;

(2) The deposited metals on the catalyst which have been converted from sulfides to oxides upon oxidative roasting of the catalyst require a reducing and/or sulfurizing treatment for reuse. It is difficult to recover the deposited metals on the catalyst as elemental metals because they are present in the form of stable oxides;

(3) The oxidation reaction proceeds at an extremely high velocity even at a low temperature and generates considerable heat to make the control of the reaction difficult.

As explained hereinbefore, the conventional fluidized-catalyst hydrotreatment processes, including the slurry-catalyst and ebullated-bed-catalyst processes, give no solution to the fundamental problems connected with the regeneration of the spent catalyst.

Therefore, it is a primary object of the present invention to provide an improved process for hydrocracking hydrocarbons in the presence of a fluidized catalyst under hydrogenation reaction conditions, in which the coke level of the catalyst is maintained below a predetermined value.

It is another object of the present invention to provide a process in which the spent catalyst extracted from the reaction system is recycled to the hydrocracking step after a novel regenerative treatment.

It is still another object of the present invention to provide a novel process including a regenerative treatment for removing toluene-insoluble carbonaceous materials which are deposited on the spent catalyst extracted from the reaction system.

It is a further object of the present invention to provide a novel two-stage hydrotreatment process for hydrocracking hydrocarbons at a coke level below a predetermined value.

In order to achieve the above-mentioned objects, the present inventor has conducted an extensive research and as a result found that the toluene-insoluble carbonaceous materials which are deposited on the catalyst may be solubilized and removed by hydrotreatment of the spent catalyst extracted from the reaction system so that the hydrotreated spent catalyst may again exhibit a high hydrocracking activity.

DISCLOSURE OF THE INVENTION

According to the present invention, there is provided a process for hydrocracking hydrocarbons in the presence of a fluidized catalyst and under hydrogenating condition for residuum conversion, in which at least part of the catalyst is extracted from the reaction system as a spent catalyst and at least part of the spent catalyst is subjected to a hydrotreatment for regenerating the catalyst by solubilizing the deposited toluene-insoluble carbonaceous materials, the regenerated catalyst being recycled to the first-mentioned hydrocracking step.

The hydrocarbons as referred to in this specification have no particular restrictions on its range so long as they are susceptible to hydrocracking, and generally include the hydrocarbons with relative low carbon residue and asphaltene contents, like naphtha, kerosene, light oil, vacuum gas oil, cracked oil, deasphalted oil and the like, as well as the hydrocarbons with relatively high carbon residue and asphaltene contents, like reduced crude oils, vacuum residues, pitch, tar, deasphalting residues, crude oils, tar sand bitumen, shale oil, coal tar, liquefied coals, pitches, solvent-refined coals, synthetic crude oils, and bituminous coal, sub-bituminous coal or brown coal with a carbon content of 60–90 wt % on dry and ash-free basis. In addition, there is no limitation on the soluble metal content in the hydrocarbon to be used in the present invention. The catalyst employed by the present invention is not deteriorated by metal deposition but rather shows a tendency of being activated by the deposited metals. Therefore, it is preferred that the crude hydrocarbon to be treated by the process of the present invention contain at least 100 ppm, more preferably, at least 200 ppm soluble metals. Of the above-mentioned hydrocarbons, coals and liquefied coals derivated from coals contain, along with a large quantity of oxygen, condensed polycyclic aromatic compounds which constitute asphaltenes and carbon residue precursors, although the content of soluble metals is relatively small. On the other hand, the petroleum oils including the tar sand bitumen and tar oil usually contain a substantial amount of soluble metals together with relatively large amounts of sulfur and nitrogen. The process of the present invention can be suitably applied to these hydrocarbons which are normally very liable to coking during the hydrocracking.

The toluene-insoluble carbonaceous materials as referred to in this specification mean the substances which remain on the catalyst after the catalyst with carbonaceous materials deposited (or adhered) thereon has been completely washed with toluene and dried. The amount of the toluene-insoluble carbonaceous materials on the catalyst is expressed in percentage by weight to the roasting residue (ashes) of the catalyst. The toluene-insoluble carbonaceous materials are the most serious cause of the catalyst deterioration among the carbonaceous materials which deposit thereon.

In this specification, the toluene-insoluble carbonaceous materials are referred to simply as "insoluble carbonaceous materials" for brevity.

The fluidized catalyst as referred to in this specification means a catalyst which is used in a fluidized state in a liquid hydrocarbon under reaction conditions, and includes the slurry catalyst and ebullated bed catalyst.

The fluidized catalyst which is generally applied to the present invention has a volume mean particle size in the range of $0.1\mu$–3 mm but may be outside that range in certain cases. For instance, since a catalyst of a smaller particle size is more preferred in the present invention, a catalyst with a particle size of about $0.01\mu$ can be advantageously used unless it involves no technical problems in its production process. The term "particle size" as used in this specification means a volume mean particle size unless otherwise indicated. Although the present invention is illustrated mainly in connection with the slurry catalyst method, it is to be noted that the teachings of catalyst regeneration which will be shown hereinlater is also applicable in a similar fashion to other fluidized catalyst processes including the ebullated bed process and so on.

The term "coke level" as used in this specification gives the indication of the degree of catalyst deterioration or reactor contamination, and is expressed by a ratio of the carbon content in the carbonaceous materials which remain on the catalyst when the spent catalyst is washed with toluene and dried to the roasting residue of the spent catalyst in terms of a percentage by weight.

The finely particulate catalyst to be used as a fluidized catalyst in the present invention may be selected arbitrarily from almost all kinds of fine solid particles or solid colloids. For example, there may be employed silica, alumina, titania, zirconia, alumina-silica, silica-titania, magnesia, magnesium silicate, calcium silicate, carbon and coke with a particle size of generally not greater than $200\mu$, preferably not greater than $100\mu$, in addition to ordinary hydrotreatment catalysts in a pulverized form. Of course, the objects of the present invention can be achieved with use of a particulate catalyst having a particle size greater than $200\mu$, but in such a case the solubilizing reaction for solubilizing the deposits of carbonaceous materials on the catalyst by hydrogeneration in the regenerating step becomes slow and the catalyst tends to settle down in the raw material oil or product oil during the treatment. On the other hand, the advantages of the slurry catalyst is manifested more pronouncedly with a catalyst of a smaller particle size. Therefore, the catalyst is desired to have as fine a particle size as possible. In order to serve as a slurry catalyst in the process of the present invention, it is suited for the catalyst to have a particle size not greater than $50\mu$, especially to have a form of an ultra-fine particles of $10\mu$ or smaller. The catalyst slurry containing such an ultra-fine particles can be handled substantially similarly to a homogeneous liquid and can contribute to reduce the abrasive wear of the reaction equipment to a considerable degree as compared with a catalyst slurry containing coarse particles. Further, it can easily pass through a fixed bed of known hydrogenation catalyst for regenerative hydrotreatment, without clogging the fixed bed. Examples of such ultra-fine particulate catalysts include solid colloid particles smaller than $1\mu$ and ultra fine colloid particles as disclosed in Japanese Patent Application No. 53-109361. More specific examples of the ultra-fine particulate catalyst useful in the present invention are colloidal particles or ultra-fine solid particles which are obtained by treating, under the pressure of hydrogen and/or hydrogen sulfide and at a high temperature, a $\beta$-diketone metal salt of the metal of Groups Va, VIa or VIII of the Periodic Table, a penta or hexacarbonyl compound of V, Mo, Fe, Co, or Ni, a heteropolyacid of the metal of Group VIa of the Periodic Table, a naphthenate of Mo, Co or Ni, a phthalocyanine compound of Cu, V, Fe, Co, Ni or Pt, molybdenum blue, a chloride or oxychloride of V, Mo, or Ti; or ultra fine pulverized particles of an oxide or a sulfide of the metal of Groups Va, VIa or VIII of the Periodic Table. Further, the ultra fine particulate catalyst to be used in the present may be known hydrotreatment catalysts, catalysts having a metal with hydrogenation activity supported on various carriers, or dervatives of natural substances containing such metals. According to a completely new finding by the inventors, white carbon (including silica or calcium silicate in the form of ultra-fine particles) which has been developed as a filler in the fields of rubber and plastics industry as a substitute for carbon black, as well as ultra fine metal oxide particles of alumina, titania and alumina-silica produced in the same manner as in the white carbon manifest excellent properties as the finely particulate catalyst in the present invention. Although no explanation seems necessary with regard to the white carbon which is widely available as a commercial product, reference is recommended, if desired, to pages 31 to 58 of "SCIENCE OF NEW INDUSTRIAL MATERIAL" (edited by Shoichiro Nagai and published in 1967 by Kimbara Publishers).

The fine particles which are exemplified hereinbefore can be classified into a category which contains a catalytic metal with hydrogenation activity and a category which does not. It is quite surprising that the fine particles of both categories contribute to prevent the reactor from being closed off by adsorbing or holding thereon the carbonaceous materials and coke precursors which are produced in the thermal cracking of hydrocarbons under hydrogen pressure. The reason why the fine particulate containing no metals having hydrogenation activity may exhibit catalytic activity is probably attributable to the oil-soluble vanadium compounds which are contained in a concentration of 5–5,000 ppm in the hydrocarbons including a residual oil, the vanadium compounds being precipitated on the fine particles having no hydrogenation activity in the course of the hydrotreatment to impart catalytic action thereto in the initial stage of the reaction. The thus precipitated vanadium compounds remain on the fine particle as they are without being influenced during the regenerative treatment, so that the activity of the catalyst is increased more and more by the cyclic use. The present inventor has ascertained that, in the hydrotreatment of a hydrocarbon with an oil-soluble vanadium compound, addition of a small amount of fine particles of silica having no hydrogenation activity causes gradual increases with the lapse of time in the rates of desulfurization, demetallization and asphaltene-decomposition, while the amount of precipitation of the carbonaceous materials on the catalyst is decreased. However, in order to increase the reaction rates, above all, the rates of removal of sulfur, nitrogen and soluble metals and at the same time to obtain a treated oil which has low carbon residue and asphaltene contents and which is low both in bromine value and in the quantities of unsaturated components, it is desired to use a catalyst which contains a metal with hydrogenation activity. The carriage of such a metal is effective for reducing the deposition of the carbonaceous materials in the hydrocracking step, preventing cohesion of individual catalyst particles, and enhancing the initial activity of the catalyst. In a case where the feed hydrocarbon has low metal contents, it is desired to use as a catalyst fine particles which contain catalytic metals.

The hydrogenation-active metal to be contained in or supported on the fine particles is selected from the group consisting of the metals of Groups Ib, IIb, IIIa, IVa, Va, VIa and VIII of Periodic Table, Mn and Sn. The hydrogenationactive metal content in the fine particles is at least 0.01 wt %, normally in the range of 0.05–2 wt % in the case of platinum metals. With metals other than platinum metals, it is at least 0.1 wt %, normally in the range of 1–10 wt %. In the present invention, it is preferred to use a metal selected from the group consisting of Cu, Zn, lanthanide, Ti, V, Cr, Mo, W, Fe, Co, and Ni. These metals may be used solely or in combination of two or more. According to the present invention, it is preferable to employ a combination of at least one metal selected from the group consisting of V, Cr, Mo and W and at least one metal selected from the group consisting of Cu, Zn, lanthanide, Ti, Fe, Co and Ni. By using a combination of at least two kinds of metals, it becomes possible to obtain a catalyst with high hydrogenation activity, which is less susceptible to the deposition of carbonaceous materials. The metals may be used in an arbitrary form, for example, in the form of elemental metal, sulfide, oxide, nitride, boride phosphate and the like.

As the carrier for supporting the above-mentioned hydrogenation-active metals, substances which do not contain the above-mentioned metals or their analogue may be used. Examples of the carriers include silica, alumina, titania, silica-alumina, magnesia, boria, zirconia, magnesium silicate, calcium silicate, activated carbon, carbon black, cokes, zeolite, lanthanide oxide which are usually employed as a hydrocracking catalyst. For supporting the hydrogenation metals on the finely particulate carrier, there may be employed an ordinary method such as the impregnation method, spray-drying method or vacuum evaporation method, or the method as described in Japanese Patent Application No. 54-139883 in which fine powder of the carrier is impregnated with a solution of a metal compound such as acetylacetone metal salt, metal phthalocyanine or metal carbonyl in an organic solvent like alcohol and ester. Alternatively, the finely particulate catalyst containing the hydrogenation metals can be obtained by supporting the metals on coarse carrier particles by the known method, followed by wet or dry type pulverization into finer particle sizes. Further, the finely particulate catalyst may be obtained by subjecting a solution or dispersion which contains a soluble or colloidal precursor of the carrier along with a metal compound to a spray-drying treatment to obtain fine powder, followed by calcination. The catalyst carrier to be used in the present invention has a pore volume of at least 0.2 cc/g, preferably at least 0.5 cc/g and more preferably at least 2 cc/g, and a specific surface area of at least 1 m$^2$/g and more preferably at least 50 m$^2$/g.

According to the present invention, it is preferred to employ a high gradient magnetic separation method for separating the slurry catalyst from the product oil resulting from the hydrotreatment, as will be described in greater detail hereinlater. In such a case, it is preferred that the catalyst contain at least one hydrogenation-active metal selected from Cu, lanthanide, Ti, V, Mo, Fe, Co and Ni supported on a suitable carrier such as silica, alumina or silica-alumina, or contain at least one metal selected from V, Mo, Fe, Co and Ni supported on titania or lanthanide oxide. These catalysts can be easily separated in a slurry form from the product oil by the high gradient magnetic separation method and exhibit high activity with reduced deposition of the carbonaceous materials thereon.

The conditions of the hydrotreatment to be used in the process of the present invention are determined arbitrarily depending upon the object of the treatment, the properties of the hydrocarbons to be treated and so on. In order to prevent excessive deposition of carbonaceous materials on the catalyst during the hydrocracking treatment, the partial pressure of hydrogen is maintained normally at 10–350 kg/cm$^2$, preferably at 30–250 kg/cm$^2$, while the reaction temperature is maintained normally at 350°–500° C., preferably at 400°–480° C. More preferably, the hydrogen pressure is in the range of 50–200 kg/cm$^2$ and the reaction temperature is in the range of 430°–460° C. Although the hydrogenation reaction takes place even if the partial pressure of hydrogen is lower than 10 kg/cm$^2$, a treatment under an extremely low partial pressure of hydrogen is undesirable because the amount of coke deposition on the catalyst increases considerably and, therefore, the catalyst tends to agglomerate. The upper limit of the partial pressure of hydrogen is determined for the purpose of reducing the chemical hydrogen consumption as much as possible. One feature of the reaction in the presence of the finely particulate catalyst resides in that it proceeds at a high reaction rate even under such a low partial pressure of hydrogen.

The sulfur contained in most of the hydrocarbons to be subjected to the hydrotreatment is partly released in the form of hydrogen sulfide so that the reaction normally proceeds in an atmosphere substantially containing hydrogen sulfide. The increase in partial pressure of hydrogen sulfide contribute to the suppression of the deposition of the carbonaceous materials on the catalyst as well as to the enhancement of the reaction rate including the demetallization and asphaltene decomposition rates. Therefore, it is very effective to add to the feed hydrocarbon hydrogen sulfide precursors which are easy to decompose such as carbon disulfide, mercaptans and the like, thereby positively increasing the partial pressure of hydrogen sulfide without depending on spontaneously produced hydrogen sulfide alone. Depending upon the kind of the catalyst and the reaction conditions, the partial pressure of hydrogen sulfide is arbitrarily selected in the range of 0.1–50 kg/cm$^2$, preferably in the range of 0.5–15 kg/cm$^2$.

The ratio of the finely particulate catalyst to the feed hydrocarbon may be of any arbitrary value so long as the fluidity of the feed mixture can be maintained, and is normally in the range of 0.1–20 wt %, preferably in the range of 0.5–10 wt %. Use of the catalyst in excess of the upper limit may rather give good results in some cases but it is undesirable since the catalyst bed is easily clogged even by deposition of a small amount of carbonaceous materials. The lower limit is determined from the standpoint of the maintenance of high desulfurization and demetallization rates and the prevention of the contamination with coke of the inner reactor walls.

In a hydrotreatment using the finely particulate catalyst as a suspended bed, the deposition of carbonaceous materials on the catalyst takes place more rapidly than on the conventional hydrogenation catalysts. Therefore, if the reaction is continued in that state, closing-off of the reactor occurs sooner than a drop in the catalytic activity. Consequently, it is necessary to previously determine the coke level which will not impede to the reaction and to lower the coke level of the catalyst in the reactor by extracting spent catalyst bearing the carbonaceous materials and recycling same to the reactor after removal of the deposited carbonaceous material by a regenerative treatment. The decarbonization by hydrotreatment according to the present invention is the most desirable method for the continuous operation. It is to be noted that such a decarbonization by hydrotreatment is based on a completely new finding by the present inventor.

The range of preferred coke level to be maintained in the present invention is generally determined depending upon the amount of coke deposition during the hydrocracking treatment, the rate of deterioration of the catalyst caused by coke deposition, and the facility of regeneration of the spent catalyst, namely, the level of the catalyst activity which is required in the hydrocracking step and the coke solubilizing rate in the regenerative step. More specifically, the coke level to be maintained is determined depending upon the properties of the catalyst including its particle size, pore volume and composition, the catalyst concentration in the reaction system, the properties of the feed hydrocarbon including the hydrocarbon composition, boiling point range, residual carbon content, soluble metal content and ash content, the reaction system and conditions for the hydrocracking treatment, and the reaction system and conditions for the regenerative treatment. Of the above-mentioned various factors, the particle size of the catalyst is regarded as the most important factor for determining the coke level in the present invention. The coke level is generally in the range of 10–70%, preferably 10–30% for a catalyst with a particle size of 0.2–3 mm, and generally in the range of 10–200%, preferably 20–50% for a catalyst with a particle size of 50–200$\mu$. In a case where the particle size is not greater than 50$\mu$ and especially not greater than 10$\mu$, the coke level varies largely depending upon the catalyst composition, but generally is in the range of 10–1000%, preferably in the range of 30–100%. With regard to a carbon-base catalyst which mainly consists of activated carbon, carbon black or coke powder, the coke level to be maintained should be considerably higher than the above-mentioned value and normally higher by 5–20 times.

According to the present invention, as soon as the coke level reaches a predetermined value during the hydrocracking treatment of the hydrocarbon, part of the catalyst is extracted from the reaction system along with the product oil for the regenerative hydrotreatment in the presence or absence of a catalyst to dissociate or remove the deposited carbonaceous materials from the catalyst, the regenerated catalyst being recycled to the reactor. Although it is most desirable that the catalyst particles be extracted from the hydrocracking reaction system in the form a suspension in the product oil and sent to the regenerative hydrotreatment in that form, the catalyst may be separated from the extracted product oil and subjected to the regenerative hydrotreatment along with fresh hydrocarbons, recycling, after solid-liquid separation, the regenerated catalyst alone to the primary hydrocracking step while returning the hydrocarbons to the regenerative hydrotreatment step.

The insoluble carbonaceous materials deposited on the spent catalysts are rendered soluble in the regenerative step. The solubilizing reaction which takes place in this step is not clear at the present stage but obviously includes a hydrogenation reaction for the following reasons: (1) the solubilization of the insoluble carbonaceous materials is greatly influenced by the hydrogen pressure and temperature; (2) the solubilization of the insoluble carbonaceous materials does not occur in the thermal treatment of the spent catalyst in the presence of a non-hydrogen-donative liquid hydrocarbon like naphthalene and under a nitrogen pressure; (3) the solubilization of the insoluble carbonaceous occurs when the spent catalyst is thermally treated in the presence of a hydrogen-donative hydrocarbon like tetraline under nitrogen pressure; and (4) in the hydrotreatment of the spent catalysts with the same coke level, those catalysts which contain a metal of higher hydrogenation activity like molybdenum catalyst permit easier solubilization of the insoluble carbonaceous materials.

Following are some examples of the method for regenerating the slurry catalyst which has been extracted from the reaction system together with the product oil and recycling same to the hydrocracking step.

(1) The slurry catalyst is sent to the regenerating step together with the product oil and, in some cases, with a hydrogen gas to undergo the regenerative hydrotreatment, and then separated from the resulting product by a solid-liquid separation method for recycling to the primary hydrocracking step. In this case, the product of the regenerative treatment may be subjected to distillation, recycling to the hydrocracking step the distillation residue which contains the catalyst.

(2) The slurry catalyst and the product oil are subjected to distillation and the catalyst-containing residue is sent to the regenerative step for recycling the catalyst to the hydrocracking step.

(3) The slurry catalyst is separated from the product oil by a solid-liquid separation method, and after the regenerative hydrotreatment of the separated catalyst, it is recycled to the hydrocracking step. In this instance, the product oil which is separated from the catalyst may be collected as a light product. However, the product oil may be further subjected to distillation and the residue may be recycled to the hydrocracking step, if necessary.

The foregoing examples all show the typical methods for the regeneration of the slurry catalyst which is extracted from the reaction system together with the product oil and the recycling of the regenerated catalyst to the primary hydrocracking step. However, it is to be noted that the process of the present invention permits various alterations or modifications depending upon the kind of the feed oil and the particle size of the catalyst to be used. For instance, in a case where the particle size of the catalyst is not greater than $50\mu$, especially with a particle size not greater than $10\mu$, the product oil is subjected to solid-liquid separation to separate those catalyst particles alone which are relatively larger in size, recycling the separated catalyst particles to the hydrocracking step after the regenerative hydrotreatment. On the other hand, the product oil which contains finer catalyst particles is subjected to distillation, also recycling the distillation residue to the hydrocracking step. In this instance, part of the residue or in some cases all of the residue may be sent to the regenerative hydrotreatment step instead of the hydrocracking step, for the purpose of effecting the regeneration of the spent catalyst and the hydrotreatment of the distillation residue simultaneously.

In the present invention, the hydrotreatment of the spent catalyst in the regenerative step is generally effected in the presence of a hydrocarbon which is in liquid state under the reaction condition, but the hydrotreatment may be carried out under dry condition if necessary. In the hydrotreatment in the presence of a hydrocarbon, the insoluble carbonaceous materials on the catalyst are converted into solubilizable state and removed from the catalyst by dissolution into the hydrocarbon. The insoluble carbonaceous materials on the catalyst are simply solubilized in the hydrotreatment under dry condition but they are readily dissolved into the hydrocarbon oil upon recycling the hydrotreated or regenerated catalyst to the hydrocracking step. In a case where a liquid hydrocarbon is present in the regenerative step, the product oil of the hydrocracking or its distillation residue can be used for this purpose. However, it is preferred to use a distilled or deasphalted oil or it hydrotreated oil, which is substantially free of asphaltenes and low in residual carbon and which has a boiling point of at least 200° C.

The hydrotreatment in the regenerative step of the spent catalyst uses molecular hydrogen or alternatively a hydrogen-donative liquid hydrocarbon as a hydrogenating agent. Examples of the hydrogen-donative liquid hydrocarbon include hydroaromatic hydrocarbons and hydroheterocyclic compounds such as hydronaphthalenes, hydroanthracenes and hydroquinolines. Naphthalene and anthracene may be obtained by hydrocracking coal tar, deashed coal pitch or liquefied coal pitch with a high yield by the process of the present invention. It is possible to utilize the thus obtained naphthalene or anthracene fraction as the above-mentioned hydrogen-donative liquid hydrocarbon. Alternatively, for the regenerative hydrotreatment of the spent catalyst, there may be employed the so-called Birch reduction method using a mixture of a hydrogen donor containing active hydrogen like alcohols or amines and an alkali metal or alkaline earth metal. This method is advantageous because the spent catalyst can be regenerated under extremely mild, low-temperature and low-pressure reaction conditions.

The conditions of the hydrotreatment of the spent catalyst in the regenerative step vary depending upon the type of the hydrotreatment to be employed, the kind and nature of the liquid hydrocarbon which accompanies the catalyst, the amount of coke deposited on the catalyst and the composition and physical properties of the catalyst. Generally, in a case where the catalyst which is separated from the product oil by solid-liquid separation is dispersed in a residue-free hydrogen-donative solvent or a distilled oil for the hydrotreatment, the reaction is carried out at a temperature of 200°–500° C., preferably at 300°–450° C. under a partial pressure of hydrogen of 10–350 kg/cm$^2$, preferably 30–250 kg/cm$^2$. On the other hand, in a case where the hydrotreatment is conducted using molecular hydrogen but using substantially no hydrogen-donative agent, it is most preferable to employ a reaction temperature of 350–440° C. and a partial hydrogen pressure of 50–200 kg/cm$^2$. The concentration of the spent catalyst in the hydrotreatment system is at least 1 wt %, preferably in the range of 10–40 wt %.

The hydrotreatment of the spent catalyst in the presence of the residue of the product oil is generally performed at a temperature of 300°–450° C., preferably 350°–440° C. under a partial hydrogen pressure of at least 30 kg/cm$^2$, preferably in the range of 50–350 kg/cm$^2$. The concentration of the spent catalyst in the reaction system varies depending upon the type of the hydrotreatment and the particle size of the catalyst, but is normally maintained in the range of 0.1–20 wt %, preferably in the range of 0.5–10 wt %.

In order to separate and recover the ash and/or spent catalyst from the various hydrocarbons which are handled in the present invention, for example, from the product oil in the hydrocracking step, the hydrotreated oil in the regenerative step or the residual oil, a suitable solid-liquid separation method is employed according to the properties of the solid particles to be separated and the hydrocarbon oils. For example, the ordinary sedimental separation method, hydrocyclone method, centrifugal separation method, filtration method and screening methods are used solely or in combination. In these solid-liquid separation methods, the solid particles which are greater in size and specific gravity can be separated more efficiently. Therefore, the above-mentioned ordinary solid-liquid separation methods are effective for the separation of solid particles of $10\mu$ or more, specially $50\mu$ or more, but are not particularly effective for the separation of the finely particulate catalyst having a particle size smaller than $50\mu$, not to mention of the particles smaller than $10\mu$. The present inventor has conducted an extensive study in search for a solid-liquid separation method which is effective for ultra-fine particles, and found that unexpectedly the high gradient magnetic separation method permits the separation of the ultra-fine catalyst particles, for which the magnetic separation is impossible under normal conditions, even though the ultra-fine catalyst has been used as a hydrocracking catalyst for a heavy oil containing soluble metals in a large quantity, preferably more than 200 ppm and no coarsening by agglomeration of the particles is observed. The high gradient magnetic separation method is well known in the art but if desired a reference is recommended to [IEEE Transaction on Magnetics] by R. R. Order, Mag-vol. 12, No. 5, 628–435 p (1976), and [Bulletin of Powder Engineering Association] vol. 18, No. 1, 28–46 p (1981). It has been well known in the art to use the high gradient magnetic separation method for magnetic catalyst which contains a ferromagnetic metal component in considerable quantities. However, the phenomenon that the catalyst particles which are normally apathetic to the magnetic separation become magnet-senstitive when in spent state is unknown. Since such a phenomenon mainly occurs to the catalysts which are used for the hydrotreatment of heavy oils with large vanadium and nickel contents, the magnet-sensitivity of the spent catalyst is considered to be attributable to the high magnetization of the soluble metals which are deposited on the catalysts.

Thus, in hydrocracking a raw material with large soluble metal content, the high gradient magnetic separation method is significantly effective for solid-liquid separation of the extremely fine particles of the spent catalyst or solid-solid separation of the catalyst from the ash content. On the other hand, in the hydrocracking of a raw material with low soluble metal contents, it becomes possible to make the spent catalyst sensitive to the high gradient magnetic separation by using powder of a weakly magnetic material like titania or lanthanide oxide as a carrier or by supporting at least one of magnetizable metals such as Cu, lanthanide, Ti, V, Ni, Co and Fe on a carrier of silica, alumina or the like, or in some cases by supporting Mo thereon in addition to the above-mentioned magnetizable metals. Consequently, the spent catalyst, which is magnetically separable, can be efficiently separated from the product oil by solid-liquid separation even if the catalyst is in the form of ultra-fine particles of smaller than $10\mu$ in particle size and can also be separated easily from fine particulate ash. Further, when the above-mentioned catalyst is applied to the hydrocracking of hydrocarbons with large soluble metal contents, the high gradient magnetic separation of the spent catalyst is more facilitated.

In a case where a hydrocracked oil which is obtained by non-catalytic hydrotreatment of a heavy oil like tar sand bitumen containing soluble metals along with insoluble solids (ash) with a small iron content is subjected to the high gradient magnetic separation, the fine particles with high iron and vanadium are obtained. It has been found that such particles are substantially useful as a hydrogenation catalyst. Namely, the fine solid particles can be applied to the hydrocracking step as a catalyst, by recycling same to the hydrocracking step after solubilizing part of the insoluble carbonaceous materials by the hydrotreatment according to the present invention.

Any hydrogenation catalyst can be used as the second catalyst to be used in the regenerative step of the present invention. Generally, it is comprised of a porous carrier supporting thereon one or more metals selected from the metals of Groups Ib, IIb, IIIa, Va, VIa, VIIa and VIII of the Periodic Table. Examples of the porous carrier include synthetic materials such as alumina, silica, alumina-silica, zeolite, magnesia, magnesia-silica, magnesia-silica-alumina, alumina-boria, aluminum phosphate, titania, silica-titania, zirconia and the like, and natural materials such as kaolin, pumice stone, montmorillonite attapulgite, sepiolite, natural zeolite and the like, and mixtures of the foregoing materials. If it is intented to hydrocrack also the hydrocarbon which coexists in the regenerative step in the process of the present invention, it is preferred that an acidic carrier be used as the catalyst carrier. In such a case, the acidic carrier may be composed of a neutral carrier of the above-mentioned type such as alumina, silica, titania or zirconia containing therein an inorganic acid such as alumina-silica, boric acid, hydrofluoric acid, phosphoric acid or the like. In the present invention, the preferred catalyst comprises a carrier of porous alumina and/or alumina-silica supporting thereon one or more metals selected from the group consisting of V, Cr, Mo, W, Ni, Co, Cu and Pd, especially one or more metals selected from the group consisting of V, Mo and W in an amount of 3–20 wt %, preferably in an amount of 5–15 wt % in terms of metal, and one or more metals selected from the group consisting of Ni, Co and Cu in an amount of 0.5–10 wt %, preferably 1–5 wt % in terms of metal. There may be employed a carrier which contains phosphorus or boria if desired. Of the various physical properties of the second catalyst, the pore size which imposes a great influence on the catalytic activity is desired to be not greater than 150 Å, more preferably in the range of 30–120 Å. Although it is the general practice to use a catalyst of large pore size of greater than 150 Å in average pore size, in the hydrotreatment, especially in the hydrodesulfurization of heavy oils, the present invention employs a catalyst of relatively small pore size since most of soluble metals in the feed oil are removed in the hydrocracking step and the macro molecules of asphaltenes or the like are decomposed into molecules having smaller molecular weights and a large content of aromatic carbons, preventing diffusion of such molecules into the catalyst pores to suppress drops in catalytic activity due to carbon precipitation.

The hydrogenation catalyst in the regenerative step [the second catalyst] may be used in any known form, for example, in the form of a fixed bed, fluidized bed, ebullated bed, a moving bed or the like. For separating the finely particulate first catalyst from the regenerative second catalyst, it is possible to apply a known method which utilized the difference in particle size, for instance, a method of sedimental separation, electromagnetic separation, foaming separation, or a method utilizing the difference in bulk volume or the like. Among these methods, the separation utilizing the difference in bulk volume is most convenient and, for this purpose, it is desirable to employ a second catalyst which has a greater bulk volume than the first catalyst for hydrocracking and a thickness of 0.3–20 mm, preferably 0.5–5 mm at a thinnest portion to facilitate its separation from the finely particulate first catalyst and to retain sufficient physical strength and hydrogenation activity.

Further, it is preferred that the second catalyst be used in the form of a fixed bed since, in such a case, the catalyst which has been stripped of the carbonaceous materials is separated of itself from the catalyst of the fixed bed, without requiring a step exclusively for their separation. In this instance, there may be employed a fixed bed which is packed with a catalyst with an increased voidage as disclosed in Japanese Laid-Open Patent Specification No. 54-40003, or a method of Japanese Patent Application No. 54-103965 filed by the present inventor and entitled "Method for Preventing Blockage of Fixed Bed".

For regenerating the spent catalyst by the use of the second hydrotreating catalyst, the spent catalyst may be subjected to the regenerative treatment in the form of a dispersion in a light oil after separation from the product oil by the solid-liquid separation, or may be subjected to the treatment along with the product oil or its residual oil from the hydrocracking step without resorting to the solid-liquid separation. According to the process of the present invention, the spent catalyst extracted from the hydrocracking step may be sent to the regenerative step substantially in its entirety as mentioned hereinbefore. Alternatively, only part of the spent catalyst may be sent to the regenerative step, recycling the remainder of the spent catalyst to the hydrocracking step along with the distillation residue of the product oil if desired. The latter method which regenerates only part of the spent catalyst is particularly preferable from the standpoint of minimizing the scale of the regeneration apparatus in the solid-liquid separation system. In a case where only part of the spent catalyst is regenerated and recycled, the percentage by weight of the regenerating catalyst to the entire amount of the extracted catalyst is determined suitably in consideration of the nature of the feed hydrocarbon, kind of the catalyst, properties of the deposited carbonaceous materials, type of the hydrotreatment employed in the regenerative step, and its reaction conditions, but is normally at least 5.0%, preferably at least 20%. Especially, in a case where the catalyst used in the hydrocracking step has a particle size of $10\mu$ or more, especially $50\mu$ or more, which permits easy separation from the liquid, it is recommended to regenerate at least 50%, preferably at least 70% of the total amount of the extracted spent catalyst for recycling to the hydrocracking step. In such a case, the regenerating equipment of a larger scale is required but it becomes possible to recycle a large quantity of regenerated catalyst with high activity by employing severe regenerating conditions, allowing a reduction in the chemical hydrogen consumption in the hydrocracking step.

The finely particulate catalyst employed in the present invention can be circulated between the hydrocracking and regenerating steps in a suspended state (in the form of a slurry) in the product oil with or without additional hydrocarbons, and the product oil can be subjected to distillation or other treatments along with the fine catalyst particles. Therefore, no operation for separating the fine catalyst particles from the product oil is required in particular, but if desired one of the above-mentioned solid-liquid separation methods may be employed to obtain a heavy oil slurry containing the fine particles and a light product oil which is substantially free of the fine catalyst particles. The thus separated light oil is almost free of soluble metals and asphaltenes, and has an extremely small residual carbon content, so that it can serve as a fuel, a fuel for internal combustion engines or as a feed stock material for catalytic cracking or the like. The fine catalyst particles suspended in the heavy fraction can be separated in a condensed state in a residual oil of a secondary treatment such as atmospheric distillation, vacuum distillation, solvent deasphalting or the like.

The hydrotreatment in the regenerative step of the present invention is carried out under more limited conditions as compared with the hydrocracking step, and generally employs a temperature lower than in the hydrocracking step normally by at least 5° C. and desirably by at least 10° C. Irrespective of the temperature, the pressure of hydrogen is higher by at least 10 kg/cm, preferably at least 20 kg/cm$^2$ than that of the hydrocracking step in order to remove the deposited carbonaceous materials on the catalyst effectively. For example, in a case where the hydrogen pressures in the hydrocracking and regenerating steps are the same, a lower temperature is used in the regenerating step than in the hydrocracking step, and in a case where the same temperature conditions are employed in the hydrocracking and regenerating steps, a higher pressure is used in the regenerating step than in the hydrocracking step. It is preferable to perform the hydrocracking step at a high temperature and a low hydrogen pressure and to conduct the regenerating step at a low temperature and a high hydrogen pressure. For example, a partial pressure of hydrogen of 10–350 kg/cm$^2$, preferably 30–250 kg/cm$^2$ and a reaction temperature of 350°–500° C., preferably 400°–480° C. are adopted in the hydrocracking step, while using in the regenerative step a partial pressure of hydrogen of at least 30 kg/cm$^2$, preferably in the range of 50–350 kg/cm$^2$ and a reaction temperature of 300°–460° C., preferably in the range of 350°–440° C. In this manner, it is possible to employ low-hydrogen-pressure and high-temperature conditions for the hydrotreatment in the hydrocracking step, so that the hydrogen consumption can be markedly reduced in the process of the present invention in spite of an extremely high reaction rate, solving, by the organic combination with the hydrotreatment in the regenerative step, the problem of the deposition of carbonaceous materials on the catalyst which arises under low-hydrogen-pressure and high-temperature conditions, thus providing an ideal process for the hydrotreatment of hydrocarbons using finely particulate catalyst.

As clear from the foregoing description, the process of the present invention is applicable to the hydrotreatment of almost all kinds of hydrocarbons and particularly suitable for hydrocracking, demetallization or desulfurization or denitrification treatment of heavy oils, above all, a heavy oil having a residual carbon content of 2.0 wt % or more especially 10% or more or an ash content of 0.1% or more, in which the catalyst is normally susceptible to poisoning due to coke and metal depositions. The process of the invention is particularly effective for treating hydrocarbons containing residual carbon in an amount at least 5.0 wt % and/or at least 80% of heavy fraction having a boiling point of at least 350° C. along with soluble metals in a concentration at least 100 ppm, especially at least 200 ppm, while permitting prevention of deterioration of the catalyst due to deposition of the carbonaceous materials and metals on the catalyst. Since the hydrotreatment using a finely particulate catalyst in suspended state is conducted while maintaining the coke level constantly below a predetermined value, there is little probability of the reactor being blocked by the catalyst and of catalyst deterioration. A more surprising fact is that the soluble metal components of the feed hydrocarbon which have deposited on the fine particles of the catalyst can activate the catalyst to contribute the hydrocracking rather than causing catalyst poisoning.

BRIEF DESCRIPTION OF THE DRAWINGS

FIG. 12 is an illustration of the particle size distribution of the toluene insoluble contents in tar sand bitumene, obtained from micrography; FIG. 14 is a graph showing the relative speed of reductions in amount of carbonaceous materials in relation to the mean particle size ($\mu$) of the catalyst.

BEST MODE OF CARRYING OUT THE INVENTION

Figure 1:
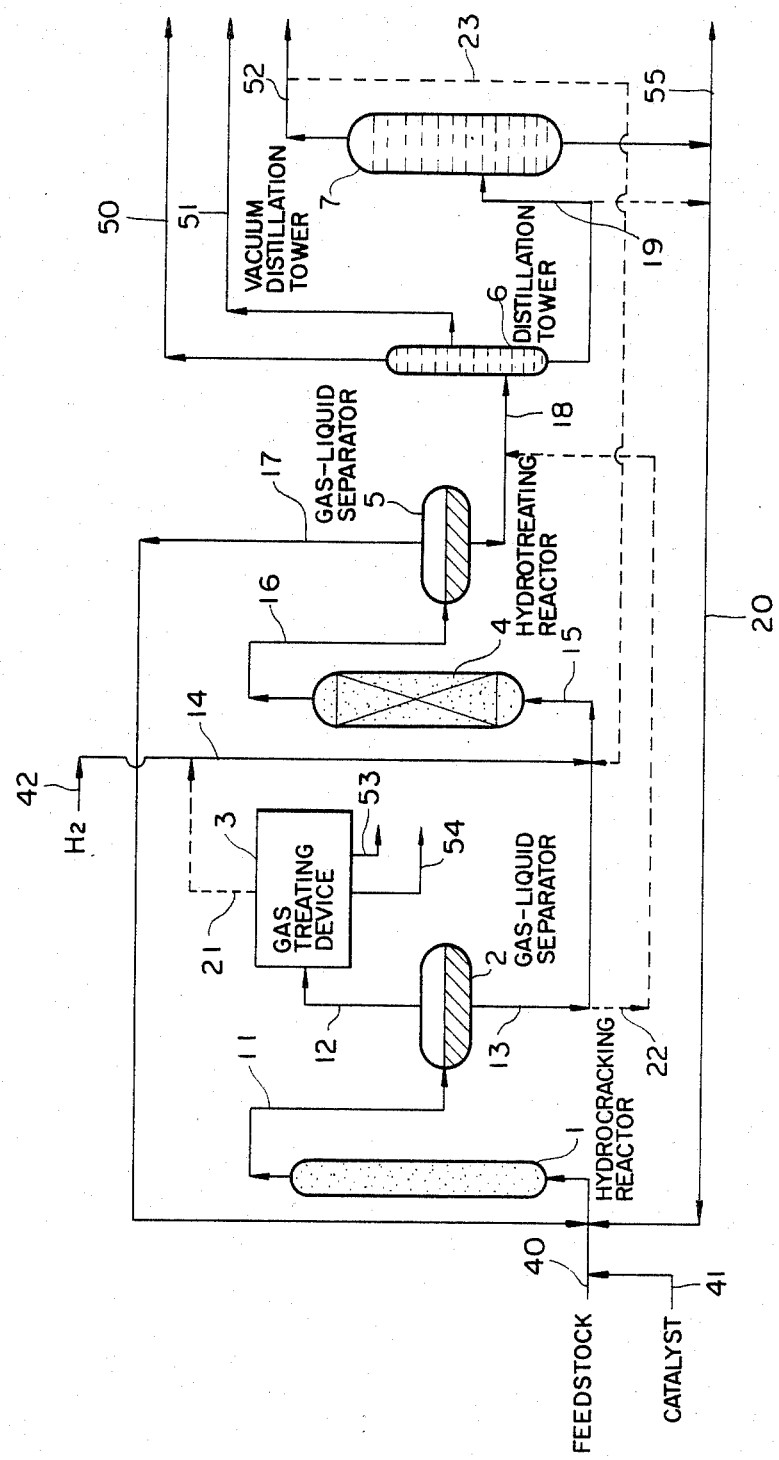
FIGS. 1 to 7 illustrate flowsheets for carrying out the process according to the present invention.

Referring to FIG. 1, the feedstock oil, finely particulate catalyst, recycling hydrogen, and recycling regenerated catalyst are admitted into a hydrotreatment reactor 1 through lines 40, 41, 17 and 20, respectively. The product of the hydrocracking treatment is extracted through a line 11 and sent to a gas-liquid separator 2. The separated gaseous product is sent through a line 12 to a recycling gas treating device 3 which separates hydrogen sulfide and $C_1$-$C_2$ gases through lines 53 and 54, respectively. The hydrogen from a line 21, after being mixed with fresh hydrogen from a line 42, is fed through a line 14 to a second regenerative hydrotreatment reactor 4 as hydrogen for carbon removing treatment. On the other hand, the separated liquid product is sent through a line 13, or in some cases through a line 15 together with vacuum gas oil from a line 23, to the second hydrotreatment reactor 4 which is packed with a catalyst for the regenerative hydrotreatment. In a case where the entire amount of the finely particulate catalyst which is extracted from the reactor 1 is not required to be treated, part of the catalyst may be allowed to by-pass the reactor 4 through a line 22. The product oil containing the finely particulate catalyst, which has been treated in the reactor 4, is sent through a line 16 to a gas-liquid separator 5 to separate the hydrogen-containing gas again. The separated gas is sent to the reaction tower 1, while the liquid product is sent to an atmospheric distillation tower 6 through line 18, in some cases along with the liquid product supplied from the line 22. In the atmospheric distillation tower 6, a propane to light oil fraction is recovered from a line 50 and a kerosene to up to 350° C. fraction is recovered from a line 51. A portion of the residue is, if necessary, recycled to the reactor 1 while a major portion of the residue is supplied to a vacuum distillation tower 7 through a line 19 to separate it into a vacuum light oil (bp 350°-550° C.) and a residue which contains finely particulate catalyst which has been stripped of the carbonaceous materials. The vacuum gas oil is extracted through a line 52 and a portion thereof may be fed to a line 23, if desired, to dilute the product oil fed to the treatment step for the removal of its carbonaceous material. The vacuum residue (b.p. 550° C. hl±) is recycled to the reactor 1 through a line 20 and is partly withdrawn from a line 55.

Figure 2:
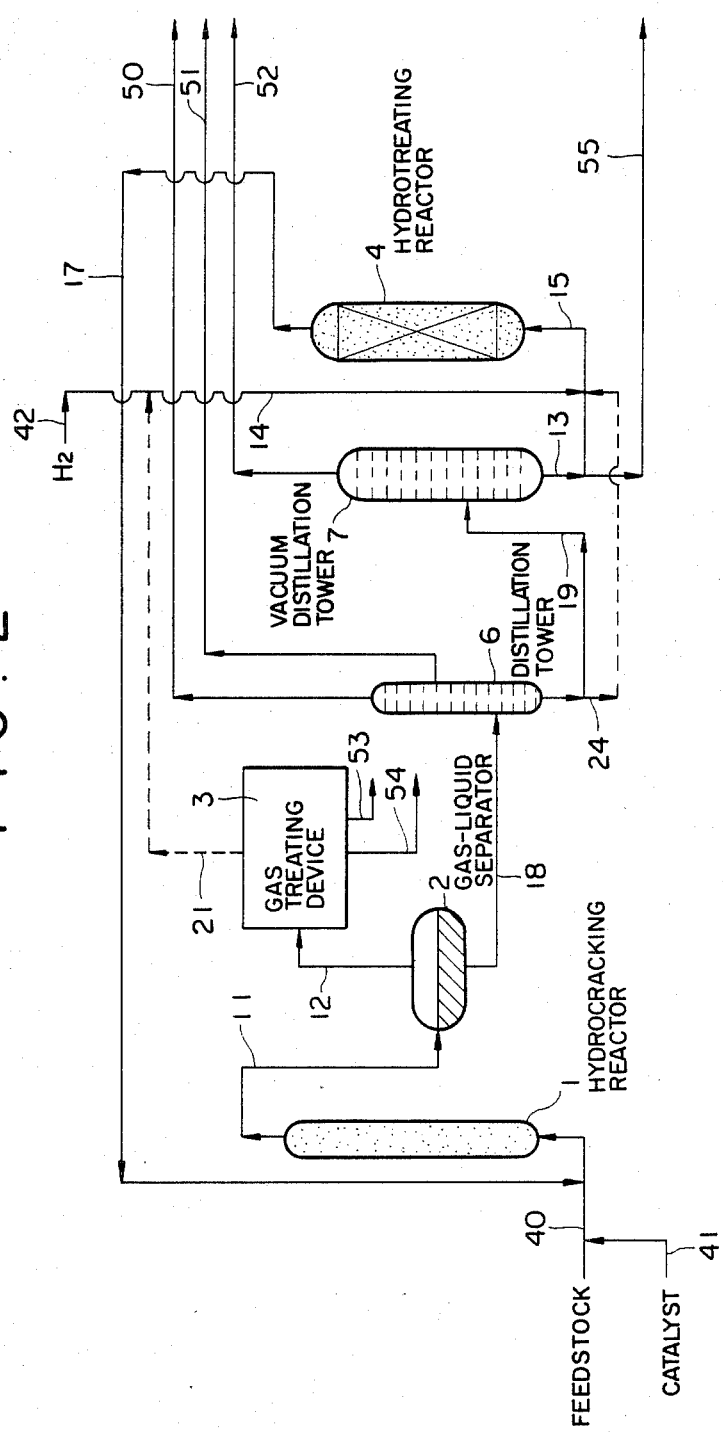

FIG. 2 illustrates a hydrotreatment process which is different from the process of FIG. 1 in that the liquid product separated in the gas-liquid separator 2 is subjected to atmospheric and vacuum distillations instead of being fed directly to the regenerative hydrotreatment, and part of the vacuum residue is fed to the reactor 4 for the hydrotreatment. In this process, only a heavy fraction is sent to the regenerative hydrotreatment of the second step so that the chemical hydrogen consumption for the production of light oil is reduced although unsaturated and sulfur contents in the light oil are increased. Therefore, this process is suitable for application where the obtained light oil is intended for use as a raw material of catalytic cracking or the like.

Figure 3:
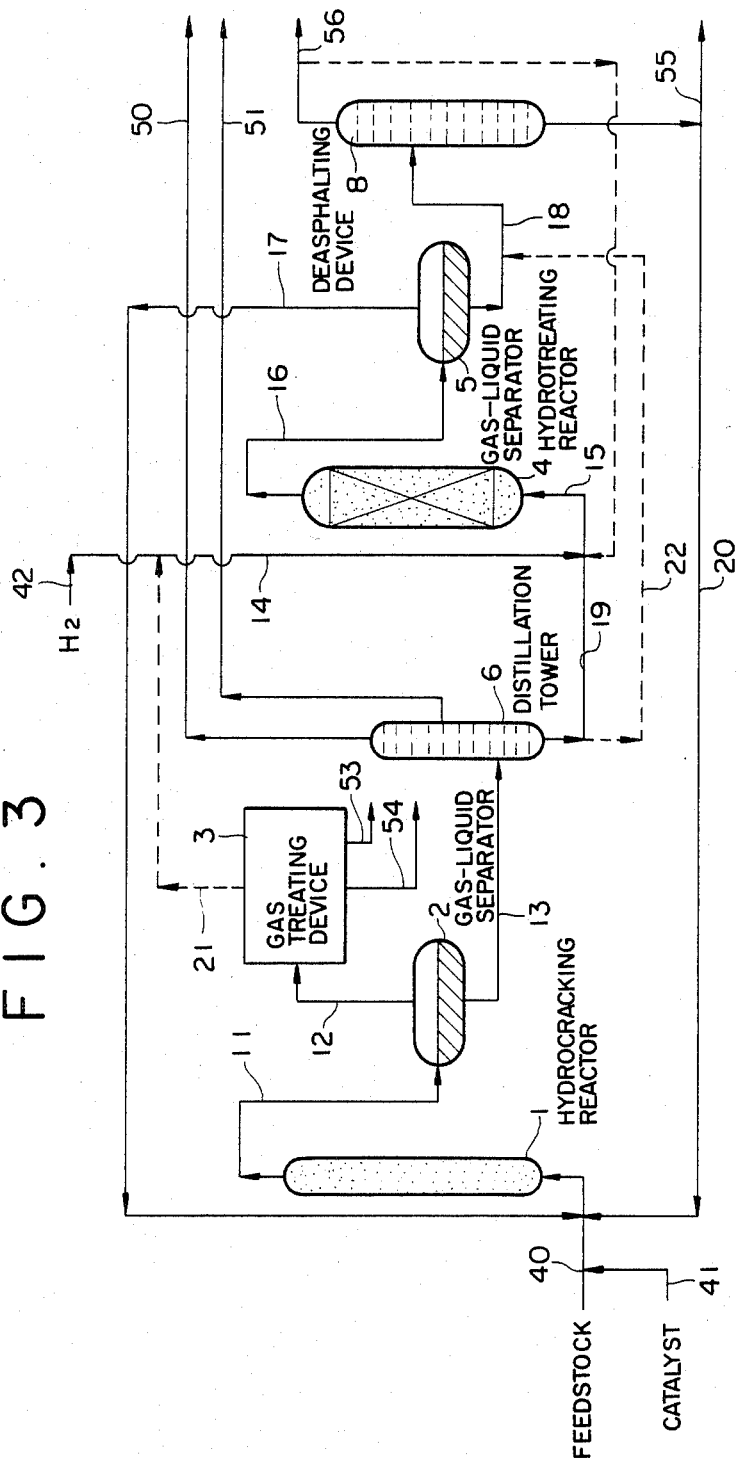

FIG. 3 illustrates a process in which the atmospheric distillation tower 6 of FIG. 1 is located upstream of the reactor 4 and a deasphalting device 8 is employed in place of the vacuum distillation tower 7. This process is suitable for producing a deasphalted oil of good quality which is especially low in asphaltene and soluble metal contents, together with a light oil with relatively large sulfur and unsaturated contents. The deasphalted oil and removed asphaltenes are withdrawn from lines 56 and 55, respectively.

Figure 4:
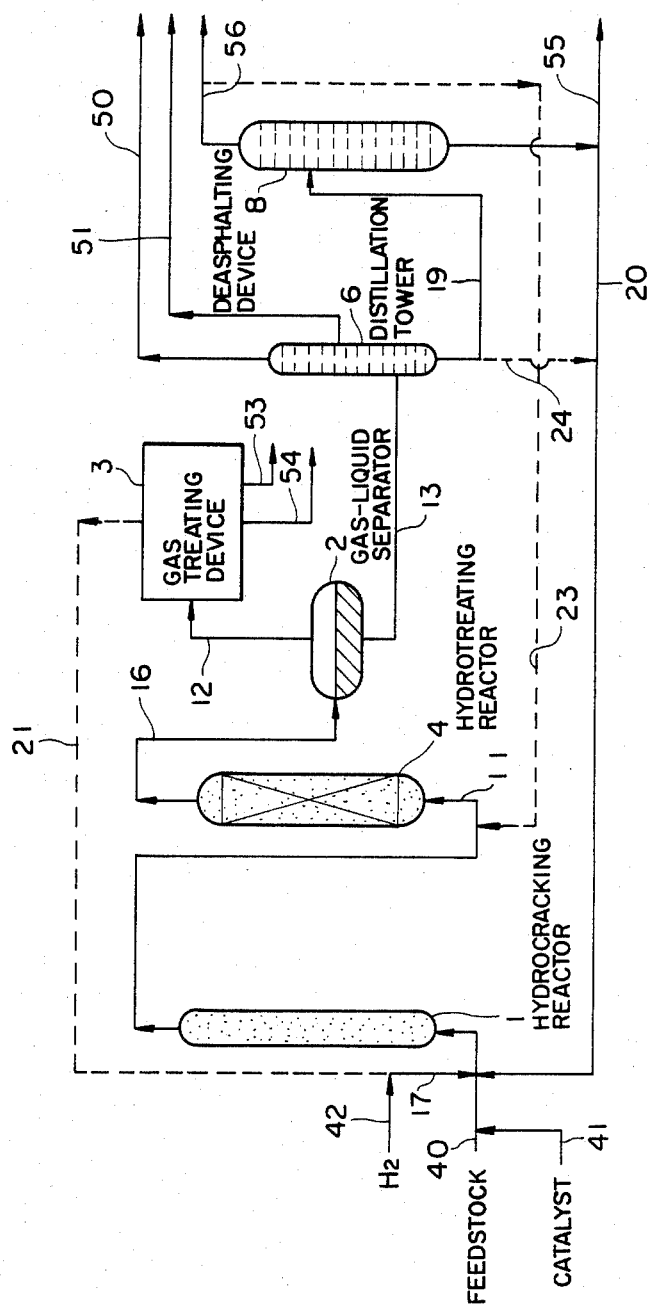

The process illustrated in FIG. 4 is basically the same as that of FIG. 1 except that the product resulting from the hydrotreatment in the reactor 1 is sent directly to the carbonaceous material-removing treatment reactor 4 without being given the gas-liquid treatment and a solvent deasphalting device 8 is employed instead of the vacuum distillation tower 7 of FIG. 1, similarly to the process of FIG. 3.

Figure 5:
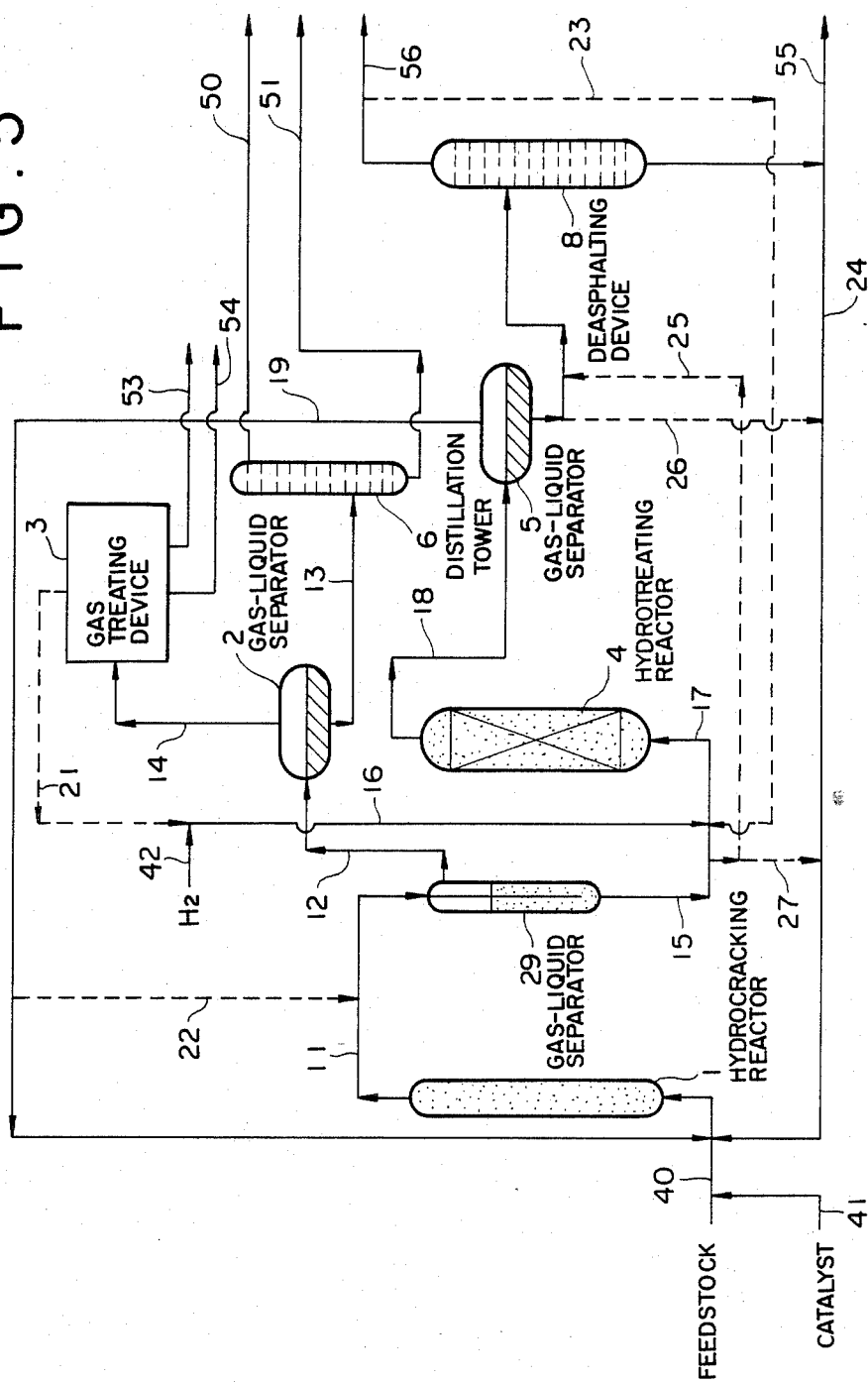

The process of FIG. 5 resembles that of FIG. 3 but is distinguished therefrom in that the atmospheric distillation tower 6 of FIG. 3 is substituted with a gas-liquid separator 29 wherein the separation is carried out while supplying a hydrogen or product gas thereto. This process has an advantage in that, since the product oil containing the fine catalyst particles is separated into light and heavy fractions under high hydrogen pressure and at a high or low (in deasphalting stage) temperature, it is possible to prevent changes in quality of the heavy oil to be recycled to the hydrotreatment and to reduce agglomeration and sedimentation of the finely particulate catalyst.

Figure 6:
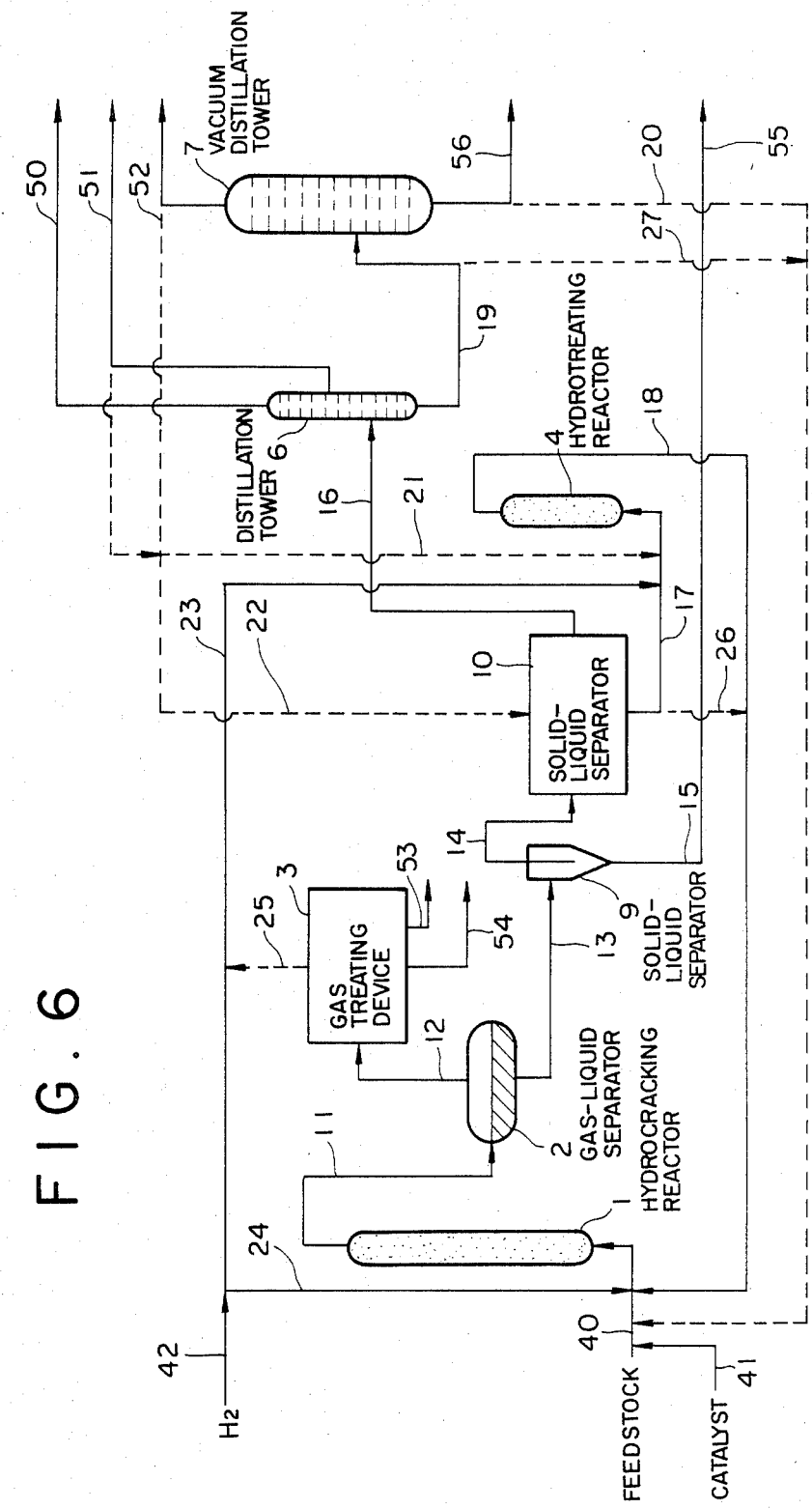

The process illustrated in FIG. 6 is characterized in that the catalyst which has been deteriorated by deposition of the carbonaceous materials is separated and condensed in solid-liquid separators 9 and 10 from the product oil of the hydrotreatment which contains the finely particulate catalyst, and sent to the reactor 4 to remove the deposited carbonaceous materials from the catalyst by the regenerative hydrotreatment before recycling same to the reactor 1. A process in which the finely particulate catalyst is recycled after solid-liquid separation and hydrotreatment in this manner is particularly advantageous when the catalyst permits easy solid-liquid separation. Such catalysts may have a particle size $10\mu$ or more, preferably $50\mu$ or more to permit easy solid-liquid separation of ordinary type and/or may substantially contain an iron family metal or vanadium to permit easy solid-liquid separation by a high gradient magnetic separation method. Further, such catalyst recycling system is also suitable for hydrocracking a raw material containing a substantial amount of ash, such as tar sand bitumen or solvent-extracted coal.

In FIG. 6, the feed material of a line 40 is sent to the hydrotreatment reactor 1 along with the finely particulate catalyst from a line 41, hydrogen from a line 42 and the regenerated finely particulate catalyst recycled through a line 18, and if desired along with the finely particulate catalyst which is recycled through a line 26 after solid-liquid separation, the vacuum residue from a line 20 or the atmospheric residue from a line 27. The liquid product which is fed from a gas-liquid separator 2 through a line 13 is sent to a first solid-liquid separator 9, where the solid content mainly consisting of ash and deteriorated and coarsened spent catalyst is extracted through a line 15 and discharged out of the system through a line 55. The supernatant liquid is sent through a line 14 to a second solid-liquid separator 10, which is preferred to be a high gradient magnetic separator but may be a hydrocyclone or a centrifugal separator. If necessary, a light oil is circulated to the second solid-liquid separator 10 from a distillation tower 6 to serve as a back-washing liquid. The separated spent finely particulate catalyst is sent to a regenerative hydrotreatment reactor 4 through a line 17 together with hydrogen from a line 23 and if necessary with the light oil from a line 21. The regenerated catalyst is sent to the inlet of the hydrotreatment reactor 1 through a line 18. On the other hand, the supernatant liquid from the second solid-liquid separator 10 is sent through a line 16 to the atmospheric distillation tower 6 and then to a vacuum distillation tower 7 to separate it into the respective fractions and residues. If necessary, the atmospheric distillation residue and/or the vacuum distillation residue may be partly or entirely recycled to the inlet of the hydrotreatment reactor through the lines 27 and 20, respectively.

Figure 7:
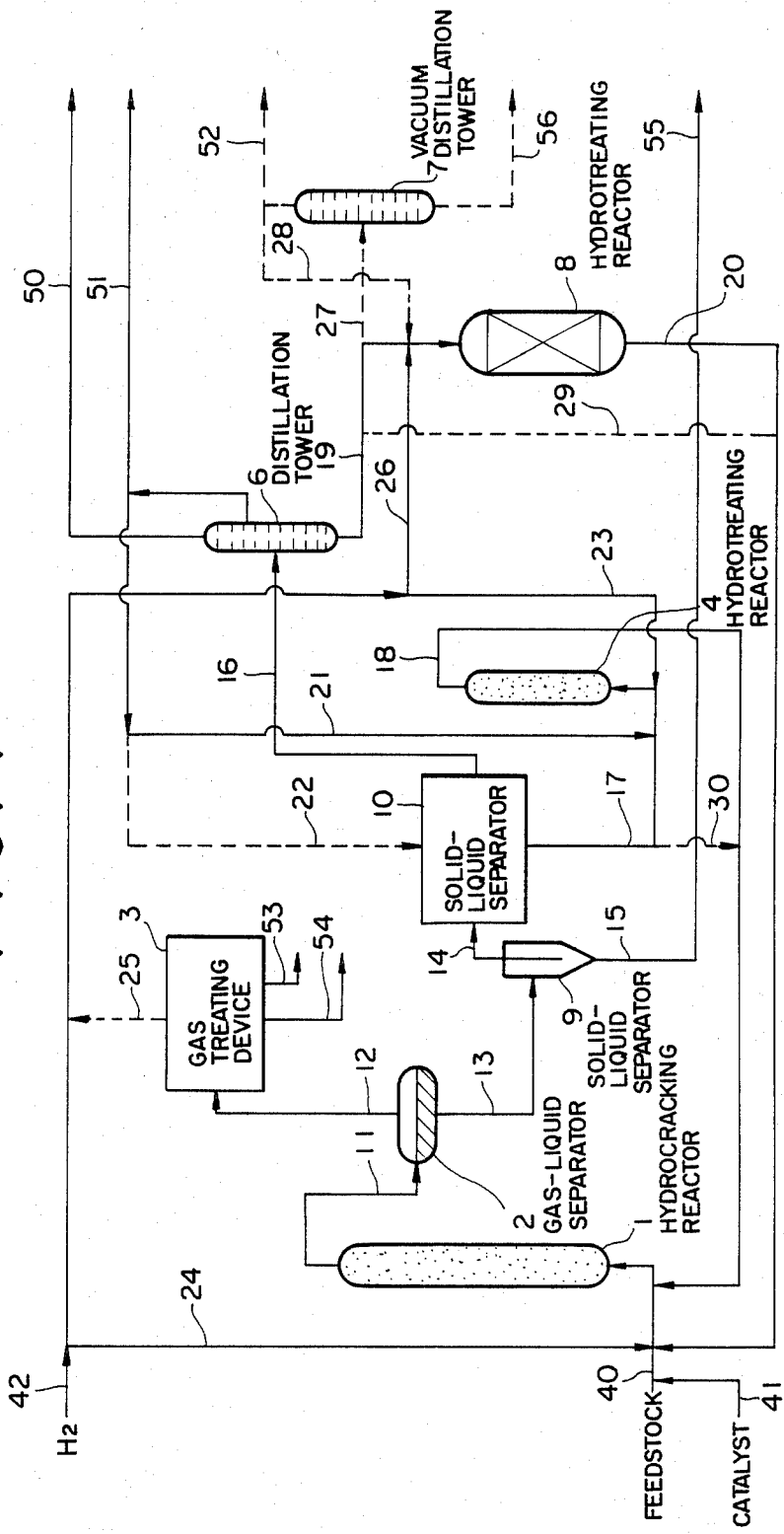

The process illustrated in FIG. 7 is basically the same as in FIG. 6 and suitable for hydrocracking similar feed materials.

In FIG. 7, the supernatant liquid from a second solid-liquid separator 10 is sent through a line 16 to an atmospheric distillation tower 6, and the residue is then sent to a residue hydrotreating reactor 8 through a line 19 along with hydrogen from a line 26. The residue fed to this reactor undergoes hydrogenation, desulfurization, denitrification, deasphalting and reductions in carbon residue, and then recycled to a first hydrotreating reactor 1 through a line 20. The hydrotreatment of the residual oil is carried out under the same conditions and in the presence of the same catalyst as in the previously described hydrotreatment of the residual oil which contains fine particles of the spent catalyst. If desired, the residual oil from the atmospheric distillation tower 6 may be recycled to the hydrotreating reactor 1 through a line 29 or to a vacuum distillation tower 7 through a line 27, and part of or the entire vacuum gas oil may be recycled to the inlet of the residue hydrotreating reactor 8 through a line 28.

One of the features of the process according to the present invention resides in that, in the hydrotreatment of hydrocarbons using in suspended state a finely particulate catalyst having a particle size preferably not greater than $200\mu$, more preferably not greater than $50\mu$, the carbonaceous materials which have deposited on the catalyst are removed by hydrotreatment in the presence of a second catalyst and the regenerated catalyst is recycled to the primary hydrotreating step. Although the two treatments are preferred to be conducted continuously, there may be employed a batch system or a semi-batch system if desired. The hydrotreatment is normally carried out in a hollow reaction tower which, however, may be internally provided with a known means or device for cooling the reaction tower, a device for preventing coking, a device for preventing sedimentation of the finely particulate catalyst or a device for mixing the feed oil and hydrogen.

The process of the present invention has the following advantages or distinctive features over the known process.

(1) There is no possibility of the reactor being blocked by coking during the hydrotreatment;

(2) The consumption of the catalyst can be held to a minimum by its regeneration and cyclic use;

(3) In a case where a fixed catalyst bed is used in the regenerative step, there is substantially no need for providing a solid-liquid separator;

(4) In the above case, the regenerated catalyst which is recycled together with a heavy fraction is free of coking since the heavy oil has been already subjected to the hydrotreatment;

(5) It is possible to use a vacuum light oil or a deasphalted oil as a diluent in the regenerative hydrotreatment and to employ a fixed bed system therefor. Further, the recirculating oils are highly refined through hydrogenolysis.

(6) The hydrotreatment may be performed at a high temperature under low hydrogen pressure, permitting the production of a light oil with a high yield by the use of a reaction column of a smaller volume and with a reduced consumption of hydrogen;

(7) It is possible to obtain a treated oil of uniform quality with a constant yield substantially over a long time period even from a heavy oil with both a high residual carbon content and a high asphaltene and soluble metal content;

(8) The yield of the product is improved since the carbonaceous materials deposited on the catalyst are converted into oil components and recovered substantially as product.

(9) The regeneration or re-activation of the spent catalyst can be effected substantially without separation from the product oil, eliminating the danger of spontaneous ignition as experienced in the conventional processes. This is a great advantage in continuous treatment of oils.

The process of the present invention will be illustrated more particularly by the following examples, in which concentrations and percentages are all by weight unless otherwise specified.

EXAMPLE 1

About 1.0% of ultra-fine particulate silica, commercially available as "white carbon", was added to an ultra-heavy feed oil of the properties shown below and uniformly mixed by sufficient mastication, kneading and vigorous stirring, followed by a hydrotreatment in an autoclave.

| Properties of Feed Oil | |
|---|---|
| Results of analysis | |
| Sulfur | 5.18% |
| Nitrogen | 0.59% |
| Vanadium | 1130 ppm |
| Nickel | 106 ppm |
| n-heptane insoluble | 11.5% |
| Conradson carbon residue | 15.9% |
| Results of distillation | |
| 350° C.+ fraction | 86.5% |

The finely particulate catalyst consisted of silica particles with almost no internal pores, which were obtained by pyrolysis of silicon tetrachloride in oxyhydrogen flame and which had a specific surface area of 380±30 m$^2$/g (by nitrogen adsorption method), an average diameter of primary particles of 80 Å, an apparent specific gravity of 0.06, and a SiO$_2$ content of at least 99.8%. After the hydrotreatment, the product oil was subjected again to a hydrotreatment, in the autoclave with incorporated therein a stainless wire mesh cylinder packed with 0.8 mm diameter spherical catalyst in an amount of about 3% of the product oil, the spherical catalyst containing 15% of MoO$_3$ and 3.5% of CoO supported on alumina carrier and having a specific surface area of 341 m$^2$/g (by BET method) and a pore volume of 0.786 cc/g (by mercury porosimeter).

The conditions of hydrotreatment in the first and second stages were as follows.

| Reaction Conditions | |
|---|---|
| Hydrogen pressure | 220–240 kg/cm$^2$ |
| Reaction pressure | 170–200 kg/cm$^2$ |
| Reaction temperature | 420° C. |
| Reaction time | 50 Hr |

The deposits in large quantities of coke and soluble metals which had been observed on the micro-particulate catalyst sampled out after the hydrotreatment of the first stage were confirmed to have been mostly dissociated therefrom by hydrogenation after the hydrotreatment of the second stage. The results of analytical studies on the properties of the finely particulate catalyst before and after the hydrotreatment of the second stage are given below.

| | Analytical Values (%) | |
|---|---|---|
| | Before | After |
| Si | 9.6 | 29.2 |
| C | 61.3 | 21.3 |
| H | 3.34 | 1.26 |
| S | 4.46 | 7.41 |
| V | 2.30 | 8.3 |
| Ni | 0.39 | 1.4 |

Calculations based on these analytical values and the properties of the fresh catalyst indicate that the coke deposition which amounts to about 300% on the basis of the fresh catalyst is diminished to about 34% after the treatment, dissociating the major proportion of the deposited coke. It has also been revealed that a major portion of the vanadium content in the feed oil is precipitated on the catalyst.

The product oil which had undergone the hydrotreatment of the second stage and containing the micro-particulate catalyst was subjected to atmospheric distillation to obtain a light fraction of light or lower oil and a residual oil containing the finely particulate catalyst. The properties of the obtained light oil are shown below. The yield of the light oil was about 80%.

| Properties of Light Fraction (C$_5$–350° C.) | |
|---|---|
| Specific gravity (D 15/4° C.) | 0.8433 |
| Sulfur | 0.14% |
| Nitrogen | 490 ppm |
| Bromine value | 3 |

To the separated residual oil were added the fresh feed oil in an amount about four times as large as the residual oil and the fresh catalyst in an amount so that the content of the catalyst relative to the oil was the same as that in the hydrotreatment of the first stage, based on fresh catalyst free of coke depositions, and the mixture was subjected to the hydrotreatment. The treatment was repeated for two times (three times in total) by the same procedures and under the same conditions, and the properties of the resulting product oil and catalyst were examined to check for variations. The catalyst used in the hydrotreatment of the second stage was replaced by fresh one for each pass in order to maintain a constant level of activity. The analytical sample of the finely particulate catalyst was separated from the product oil by the use of a 5μ teflon filter paper, a product of Millipore Co. of the United States, and washed sufficiently with toluene.

Figure 9:
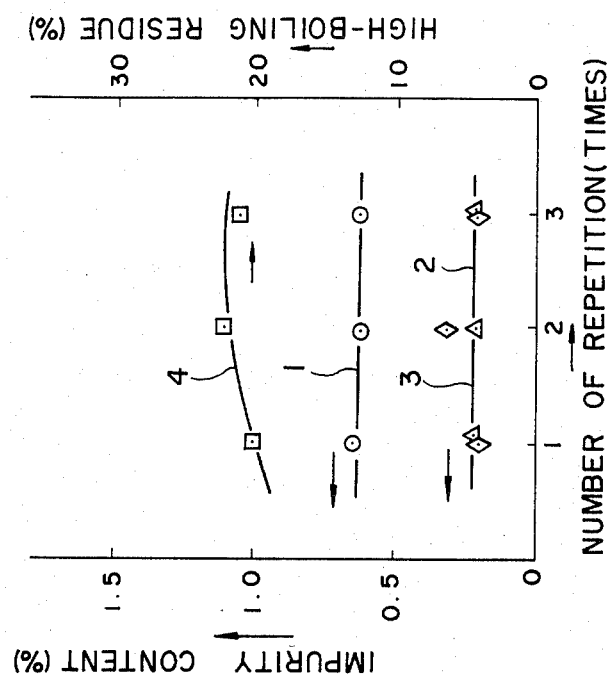
FIG. 9 is a graph showing the relationship between the repeated number of recycling of the catalyst and the properties of the product oil from the regenerative step.
Figure 8:
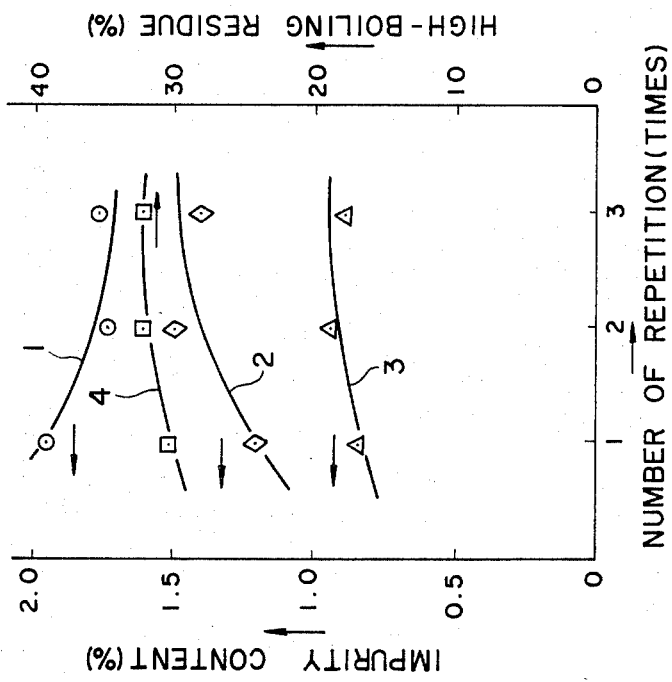
FIG. 8 is a graph showing the relationship between the repeated number of recycling of the catalyst and the properties of the product oil from the hydrocracking step.

FIGS. 8 and 9 show the properties of the treated oils resulting from the hydrotreatments of the first and second stages in the above-mentioned repeated operation. In FIGS. 8 and 9, the abscissa represents the repeated number (times) while the left and right ordinates represent the impurity content (%) in the treated oil and the high boiling point residue (%) over 350° C., respectively. Curves 1 to 4 indicate variations in the sulfur content, vanadium content, n-heptane soluble content and high boiling point residue, respectively. As clear from the results, the properties of treated oils coming out of the treatments in the first and second stages remain substantially unchanged irrespective of the finely particulate catalyst and the number of recycling times. Upon closer study of FIGS. 8 and 9, it is seen that in the treatment of the first stage the contents of vanadium, n-heptane insoluble and 350° C.+ residue have a trend of slightly increasing with an increment in the number of recycling in contrast to the slight declining trend of the sulfur content. These variations are summarized in the following table.

| | Treated in 1st Stage | Treated in 2nd Stage |
|---|---|---|
| Sulfur (%) | 1.9–1.7 | 0.63 |
| Vanadium (ppm) | 1–2 | 0.2 |
| n-heptane insoluble (%) | 0.8–0.9 | 0.2 |
| 350° C.+ residue (%) | 30–32 | 21 |

Figures 10, 11:
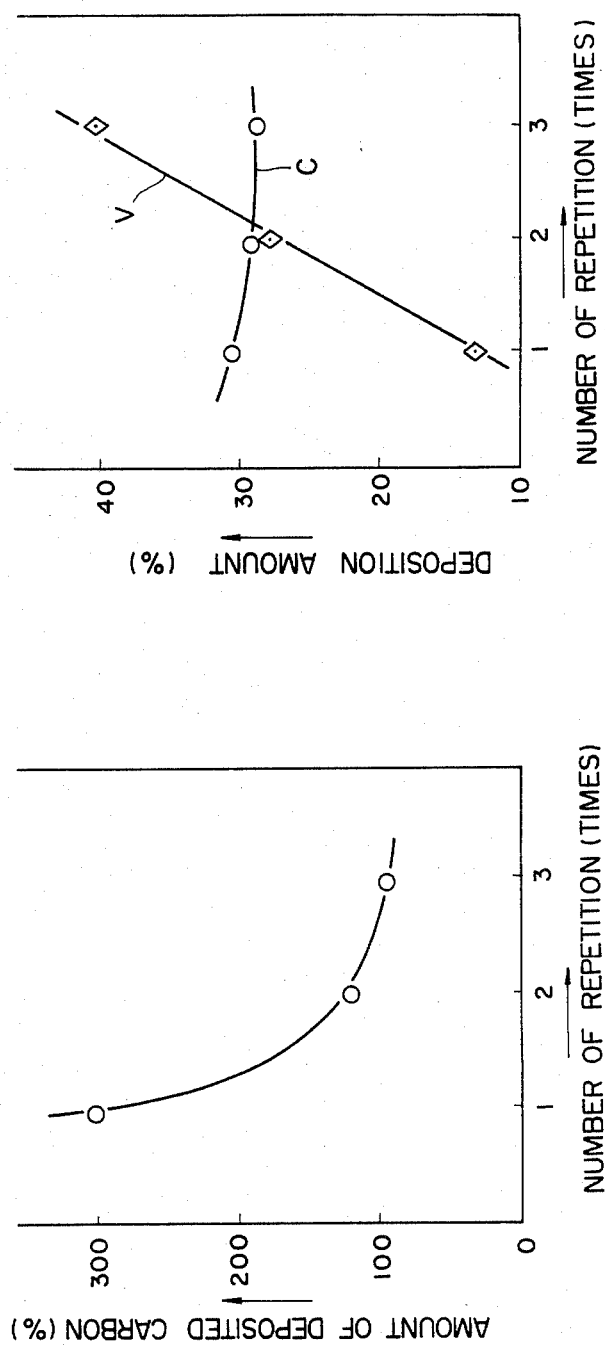
FIG. 10 is a graph showing the relationship between the repeated number of recycling of the catalyst and the amount (%) of the deposited carbonaceous materials on the catalyst in the hydrocracking step.
FIG. 11 is a graph showing the deposited amounts (%) of carbonaceous materials and vanadium on the catalyst in relation with the repeated number of recycling of the catalyst.

The amounts of carbon and vanadium depositions on the finely particulate catalyst in the repeated treatment are shown in FIGS. 10 and 11 in percentage (%) to the corresponding values on fresh catalyst, FIG. 10 showing the amounts in the first stage while FIG. 11 shows the amounts in the second stage. As clear from the results shown, although the amount of coke precipitation on the catalyst marks a considerably large value in the first treatment, it sharply diminishes in the second and subsequent treatments. This is considered to be attributable to the catalytic effects of vanadium and nickel precipitated from the feed oil. As seen from the results shown in FIG. 11, the amount of vanadium deposition on the catalyst after the treatment of the second stage increases expectedly in proportion to the number of repeated treatments and amounts to about 40% of fresh catalyst after the third treatment of the repeated operation, in contrast to the slightly diminishing trend of the coke deposition.

To summarize the foregoing results:

(1) A light oil of good quality can be obtained at a high yield;

(2) Main reactions take place in the treatment of the first stage, along with depositions in large amounts of coke and metals on the finely particulate catalyst; and (3) The finely particulate catalyst deteriorated by coke is regenerated or reactivated during the treatment of the second stage.

EXAMPLE 2

Nickel and molybdenum were supported on a carrier of ultra fine particles of alumina, commercially called "white carbon", having a specific surface area of 100 m²/g and an average diameter of primary particles of 240 Å, according to the following method.

Predetermined amounts of nickel and acetylacetone salt of molybdenum oxide were weighed out and completely dissolved in 1,4-dioxane of an about 100 times larger amount by weight. Separately, the above-mentioned carrier was added to an about 10 times larger amount of 1,4-dioxane with vigorous kneading and agitation. After sufficient kneading, a predetermined amount of the separately prepared solution of nickel and molybdenum in dioxane was added thereto and the resulting mixture was transferred into a container with a reflux condenser, followed by still heating at about 100° C. for 3 hours. After heating, a major portion of dioxane was evaporated under reduced pressure and the resulting gel was dried at 120° C. for 2 hours to volatilize a major portion of the solvent and calcined at 300° C. for 1 hour and then at 500° C. for 1 hour to obtain a lumpy mass. The lumpy mass was pulverized into fine particles in a ball mill. The resulting catalyst had the following properties.

| Properties of Catalyst | |
|---|---|
| Specific surface area | 76 m²/g |
| Amount of supported metals | |
| MoO₃ | 7.3% |
| NiO | 1.6% |

The catalyst content in the feed oil was adjusted to about 2.0% and the procedures of Example 1 were repeated. The conditions of the hydrotreatment and the properties of the catalyst in the treatment of the second stage were as follows.

| Conditions of Hydrotreatment | | |
|---|---|---|
| | 1st Stage | 2nd Stage |
| Hydrogen pressure (initial) kg/cm² | 160 | 235 |
| | 160 | 235 |
| Reaction temperature (°C.) | 430 | 420 |
| Reaction time (Hr) | 2 | 2 |

| Properties of Catalyst in 2nd Stage | |
|---|---|
| Specific surface area (by BET method) | 269 m²/g |
| Pore volume (by mercury porosimeter) | 0.510 cc/g |
| Outer diameter | 0.7 mm |
| Amount of supported metals | |
| MoO₃ | 15.7% |
| NiO | 1.8% |
| CoO | 3.8% |

The product oil resulting from the treatment of the second stage was separated into a light fraction of the properties indicated below and a residue containing the finely particulate catalyst by atmospheric distillation and by the same procedures as in Example 1. Fresh feed oil and fresh catalyst were added to the distillation residue to adjust the catalyst content in the feed oil to the same percentage as in the first treatment before recommencing the hydrotreatment. The same procedures of treatment were repeated three times. According to the results of analysis of the finely particulate catalyst after the treatment in the first and second stages, the amount of carbonaceous materials deposited on the catalyst after the treatment in the first stage was in the range of about 80–70% on the basis of fresh catalyst, irrespectively of the number of recycling time, but it was found to have dropped to 22–25% after the treatment in the second stage.

In this Example, the contents of sulfur and vanadium in the product oil after the treatment in the first stage were considerably small as compared with Example 1, but the content of n-heptane insoluble components and yield of 350° C.+ residue which were found to be almost the same showed a tendency of slightly increasing with an increment in the repeated number of the treatment.

On the other hand, the product oil from the treatment of the second stage showed, similarly to in Example 1, almost no changes relative to the repeated number of the treatment. Therefore, the light fraction collected by the atmospheric distillation was a light oil of good quality and had almost uniform properties. The main properties of C₅- 350° C. fraction collected by the atmospheric distillation were as follows.

| Properties of C₅-350° C. fraction | |
|---|---|
| Specific gravity (D 15/4° C.) | 0.8310 |
| Sulfur | 0.06% |
| Nitrogen | 180 ppm |
| Bromine value | 4 |

From the foregoing results it is appreciated that: the amount of coke deposition in the first stage can be reduced by the use of a finely particulate, metal-carrying catalyst; even when the treatment in the first stage is done at a relatively high-temperature and a low hydrogen pressure, the finely particulate catalyst is sufficiently regenerated and re-activated in the second stage; and the light oil which is separated by the atmospheric distillation is of extremely high quality and its properties remain unchanged in the course of the repeated treatment.

EXAMPLE 3

In order to confirm the effect produced by the presence of hydrogen sulfide, the same procedures as in Example 1 were repeated except for the use of a hydrogen source containing 5% of hydrogen sulfide on the basis of fresh hydrogen in the second and third treatment.

Properties of the treated oil and the amount of carbon deposition on the catalyst (on the basis of fresh catalyst) in the first stage are shown below.

| Repeated Number | 2 Times | 3 Times |
|---|---|---|
| Properties of product oil | | |
| Sulfur (%) | 2.1 | 1.9 |
| Vanadium (ppm) | 0.8 | 1.0 |
| n-heptane insoluble (%) | 0.64 | 0.67 |

| -continued | | |
|---|---|---|
| Repeated Number | 2 Times | 3 Times |
| Carbon deposition (%) | 94 | 89 |

As clear from the foregoing results, by increasing the partial pressure of hydrogen sulfide the vanadium and n-heptane insoluble contents in the product oil are reduced and the coke deposition on the finely particulate catalyst is decreased, so that, for obtaining a light oil of good quality from a heavy oil, it is effective to positively raise the partial pressure of hydrogen sulfide in the treatment of the first stage.

EXAMPLE 4

A feed oil consisting of tar sand bitumen of the properties indicated below was treated by substantially the same process as illustrated in FIG. 4. Since the feed oil contained a small amount of toluene insoluble solids, a predetermined amount of deasphalting residue separated in the deasphalting step was extracted and mixed with fresh feed oil instead of adding fresh finely particulate catalyst, recycling the mixture to the treatment of the first stage. Also, a predetermined amount of the deasphalting residue was recycled to the treatment in the second stage.

| Properties of Feed Oil | |
|---|---|
| Sulfur | 4.43% |
| Nitrogen | 0.36% |
| Vanadium | 143 ppm |
| Nickel | 78 ppm |
| Iron | 410 ppm |
| n-heptane insoluble | 9.3% |
| Conradson carbon residue | 13.0% |
| Ashes | 0.78% |
| Toluene insoluble (>1μ) | 0.97% |
| 350° C.$^-$ | 20% |

The composition of the toluene insoluble content is given below. The particle size distribution obtained from microphotographs is illustrated in FIG. 12.

| Composition of Toluene Insoluble content (%) | |
|---|---|
| Si | 15.0 |
| Al | 12.0 |
| Fe | 4.5 |
| K | 0.9 |
| Mg | 0.6 |
| Ti | 1.0 |
| Na | 1.0 |
| Mn | 0.2 |
| V | 0.1 |
| S | 6.0 |
| C | 11.5 |

Upon measuring the particle size of fine solid components after the treatment in the second stage, it was observed that the average particle size was reduced in the initial stage of reaction.

For the hydrotreatment in the first and second stages, this Example employed an ordinary high-pressure flow-through type reactor with a hollow reaction vessel of 25 mm in inside diameter, about 1 m in length of the heating zone and about 500 cc in inner volume. The reaction vessel of the second stage was provided with a catalyst layer packed with 500 cc of cylindrical catalyst for desulfurization having an outer diameter of about 1.6 mm. The properties of the catalyst used for the hydrotreatment of the second stage and the conditions of treatment in the first and second stages are shown below.

| Properties of Catalyst | |
|---|---|
| Composition | |
| $Al_2O_3$ | 79.8% |
| $MoO_3$ | 15.0% |
| CoO | 5.2% |
| Specific surface area | 292 $m^2/g$ |
| Pore volume | 0.441 cc/g |
| Average pore diameter | 60 Å |

| Conditions of Hydrotreatment | | |
|---|---|---|
| | 1st Stage | 2nd Stage |
| Partial pressure of hydrogen (kg/cm$^2$) | 160 | <160 |
| Reaction temperature (°C.) | 450 | 415 |
| Liquid space velocity (Hr$^{-1}$) | 1.2 | 1.7 |
| Hydrogen/oil ratio (Nl/l) | 1,500 | 1,000 |

The product oil of the hydrotreatment in the later stage was treated by an ordinary continuous atmospheric distiller coupled with a continuous solvent deasphalting device including a mixing vessel for the product oil and the solvent, a liquid-liquid extraction tower and a solvent separating/recoverying tower, without using the hydrogen recycling line 21 and the deasphalted oil recycling line 24 of FIG. 4. The conditions of the solvent deasphalting were as follows.

| Conditions of solvent deasphalting treatment | |
|---|---|
| Treating temperature | 120–140° C. |
| Pressure | 20–30 kg/cm$^2$ |
| Solvent ratio | 5.0 |

The feed rate of fresh raw material settled at about 540 cc/Hr at about 150 hours after commencement of cyclic operation, with constant yield of products as follows.

| Yield of Products | |
|---|---|
| $C_1$-$C_4$ | 8% |
| $C_5$-350° C. | 57 |
| Deasphalted oil | 30 |
| Deasphalting residue | 4 |

| Primary Properties of Products | | |
|---|---|---|
| | $C_5$-350° C. | Deasphalted oil |
| Sulfur (%) | 0.14 | 0.34 |
| Nitrogen (%) | 0.10 | 0.21 |
| Vanadium (ppm) | — | 0.1 |
| n-Heptane insoluble (%) | — | 0.0 |
| Conradson carbon residue (%) | — | 1.4 |

EXAMPLES 5–15

The hydrotreatment of the first and second stages in the process of Example 1 was carried out with use of various finely particulate catalysts. The results are shown below.

| Example No. | Carrier | Supported Metals (Amount: %) | Method of Preparation of the Catalyst (particle size) | Amount of Deposition (%)[1] Stage 1 | Amount of Deposition (%)[1] Stage 2 |
|---|---|---|---|---|---|
| | | | Desposition of Carbonaceous Materials on Micro-Particulate Catalyst | | |
| 5 | SiO (white carbon) | Mo(2.1) | Same as in Ex. 2 | 120 | 27 |
| 6 | SiO (white carbon) | Mo(0.9), Ni(0.2) | Same as in Ex. 2 | 84 | 35 |
| 7 | SiO (white carbon) | Mo(0.9), Cu(0.3) | Same as in Ex. 2 | 79 | 29 |
| 8 | SiO (white carbon) | V(3.3) | Same as in Ex. 2 | 93 | 27 |
| 9 | Alumina | $MoO_3$(15), CoO(3.5) | Micro-pulverization of desulfurization catalyst (<40μ) | 56 | 23 |
| 10 | Titania (white carbon) | None | —(800 Å) | 191 | 38 |
| 11 | Alumina-silica | Mo(10.7), Ni(3.4) | Micro-pulverization of granular catalyst (<40μ) | 105 | 33 |
| 12 | Sepiolite | None | Micro-pulverization of ore (1–5μ) | 177 | 23 |
| 13 | Sepiolite | Mo(2.1), Cu(0.8) | Micro-pulverization of metal-carrying catalyst (1–5μ) | 63 | 25 |
| 14 | Sepiolite | Cu(7.2) | Micro-pulverization of metal-carrying catalyst (1–5μ) | 78 | 26 |
| 15 | Activated carbon | Mo(11.8), Co(2.9) | Micro-pulverization of metal-carrying catalyst (1–5μ) | 180*[2] | 45*[2] |

*[1] Based on fresh catalyst
*[2] Estimated from values of metal analysis

Upon analytical study, the product oil in each one of the foregoing treatment was found to have uniform properties of the following ranges.

| Properties of product oils after treatment in 2nd stage | |
|---|---|
| Sulfur (%) | 0.3–0.8 |
| Vanadium (ppm) | 0–1.2 |
| n-heptane insoluble (%) | 0–0.5 |
| 350° C.+ (%) | 17–25 |

As clear from the foregoing results, the produced light oil is of good quality and almost free of vanadium and n-heptane insoluble contents. The foregoing results also show that a substantial amount of deposited coke is dissociated from each catalyst by the treatment in the second stage, permitting to recycle the catalyst partly or in its entirety to serve for the treatment in the first stage.

EXAMPLE 16

A residual oil having a specific gravity of 0.8882 (15/4° C.) and containing 3.86% of conradson carbon residue, 0.13% of sulfur, 0.23% of nitrogen, 90.2% high boiling point residue of over 350° C. and 48.4% of high boiling point residue of over 540° C. was hydrocracked in a flow-through type reactor with a reaction temperature of 450° C., hydrogen partial pressure of 30 kg/cm$^2$, liquid space velocity of 1.0 Hr$^{-1}$ and hydrogen/feed oil ratio of 1000 l/l, using a catalyst consisting of finely powdery silica supporting thereon 6.7% of $MoO_3$ and 1.3% of CoO and having a specific surface area of 100 m$^2$/g, pore volume of 5.2 cc/g and a particle size of 5–10μ. The catalyst was added in an amount of 2.0% of the feed oil, and the spent catalyst was separated from the product oil by the use of a 5μ filter. The catalyst which was collected by the solid-liquid separation was added with a ten times greater amount of tetralin, serving as a hydrogen-donative hydrocarbon, and subjected to a hydrotreatment in an autoclave with a hydrogen partial pressure of 50 kg/cm$^2$, reaction temperature of 400° C. and reaction time of 2 hours, to remove the carbonaceous materials from the catalyst, collecting the regenerated catalyst after solid-liquid separation. The regenerated catalyst was added to the feed oil in an amount of 2.0% on the basis of fresh catalyst for hydrocracking the same residual oil under the same conditions as mentioned above.

After the reaction, the catalyst was again recovered from the product oil, repeating the regeneration and hydrocracking in the same manner as described above. In each hydrocracking experiment, the analysis of the filtrate, which was obtained after separation of the solid contents, revealed that there was produced a lightened oil containing about 48.9% of high boiling point residue of above 325° C., 9.8% of high boiling point residue of above 540° C. and 1.4% of residual carbon, irrespective of the number of times the catalyst was recycled. On the other hand, it was observed that the repeated use of the catalyst caused gradual increases of the butylene/butane ratio in the gaseous product as well as of the nitrogen content in the IBP - 180° C. fraction (naphtha) which was separated from the product oil. Similarly, upon analyzing the powdery catalyst recovered in each experiment, it was observed that the repeated use of the catalyst caused gradual increases to the carbon content and deterioration of the catalyst due to deposition of the carbonaceous materials.

Further, for comparison with the above-described experiments of repeated use after hydro-regeneration, the same catalyst was used repeatedly in the same manner but without the regenerative hydrotreatment. Analysis was conducted of the butylene/butane ratio in the gaseous product, the nitrogen content in the IBP - 180°

C. fraction and the carbon content in the spent catalyst recovered by solid-liquid separation.

Figure 13:
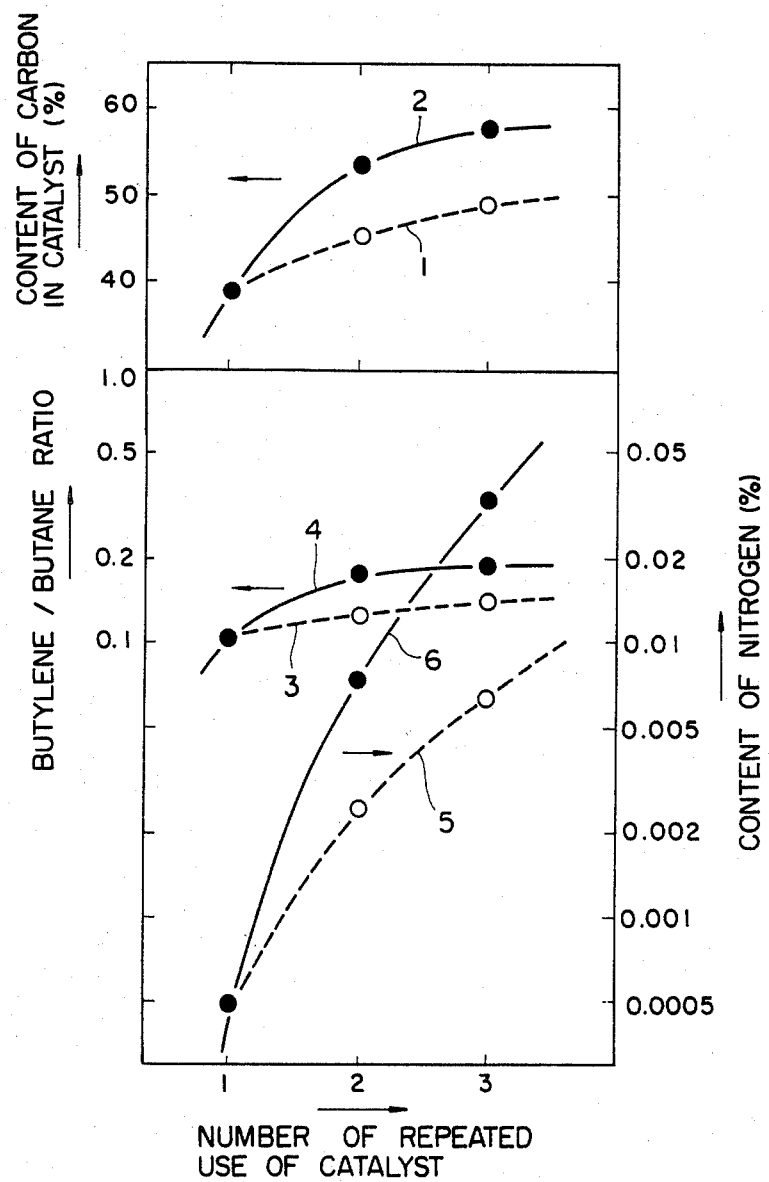
FIG. 13 is a graph showing the ratio of butylene/butane, impurity content (%), nitrogen content (%) and carbon content (%) in the catalyst in relation to the number of times that the catalyst is required.

FIG. 13 shows the results of the above-described experiments, in which curves 1, 3 and 5 plot the results of the regenerated catalyst while curves 2, 4 and 6 plot the results of the nonregenerated catalyst.

It will be seen from FIG. 13 that, in the repeated use of the powdery catalyst, the regenerative hydrotreatment lowers the carbon content in the spent catalyst and accordingly the butylene/butane ratio in the gaseous product, and reduces the nitrogen content in the IBP - 180° C. fraction. Thus, by hydrotreating the spent powdery catalyst in a hydrogen-donative hydrocarbon oil according to the present invention, the deteriorated catalyst is activated by dissociation of the deposited carbonaceous materials and as a result the paraffin content in the cracked gas increases, improving the denitrification rate of the light oil.

Further, in the experiment of Example 16 repeatedly using the spent catalyst after regeneration, no agglomeration of the catalyst particles was found by microscopic observation and no coke deposition was traced by eye observation within the reaction tube which was washed with a solvent for removing the oil subsequent to the reaction. Thus, it will be understood that in the experiment of Example 16 according to the invention, the catalyst is deteriorated to some extent by deposition of the carbonaceous materials but not to such an excessive extent as would cause agglomeration and sedimentation of the catalyst particles.

EXAMPLE 17

For the purpose of studying the deterioration in activity by the deposit ion of carbonaceous materials on the finely powdery catalyst used in Example 16, the same ultra-heavy oil as used in Example 1, which contained carbon residue and soluble metals in far greater amounts than in Example 16, was hydrocracked in an autoclave, observing the spent catalyst which was collected after the reaction. In this experiment, the hydrocracking reaction was carried out at a higher-temperature and a lower hydrogen pressure than in Example 1 and the amount of the catalyst was reduced to 1/5–1/20 in order to increase the depositing speed of the carbonaceous materials on the catalyst. The results of these experiments are shown in the following table.

materials exceeds about a 40 times greater amount. Examination of scanning electronic micrographs (magnification: 1000) of the spent catalysts collected in the foregoing experiments revealed that agglomeration of the catalyst particles increased from Experiment No. 1 to No. 3 in which the deposition of the carbonaceous materials occurred in greater degree in that order. Thus, the process of the present invention is effective not only for activating the catalyst which is deteriorated by deposition of carbonaceous materials but also for preventing agglomeration and sedimentation of the catalyst and the coke-up of the reactor.

Furthermore, the degenerated catalyst which was coarsened by agglomeration in experiment 3 was subjected to a hydrotreatment using a hydrogen-donative hydrocarbon or a pressurized hydrotreatment in the form of a dispersion in a light oil. In either case, the deteriorated catalyst was divided again into fine particles.

EXAMPLE 18

Colloidal silica containing 20% of $SiO_2$ was added as a binder to hydrophobic, fine silica powder and, after kneading, the mixture was formed into cylinders of 1 mm. After the moldings were calcined at 500° C. for 3 hours, about 2.4% of molybdenum was supported on the calcined mass through contact with molybdenum hexacarbonyl [$Mo(Co)_6$] vapor at 120° C. under a reduced pressure. The resulting catalyst had a specific surface area of 130 $m^2/g$ and a pore volume of 1.9 cc/g. The catalyst was then finely pulverized to obtain finely particulate Mo-carrying silica catalysts having average particle sizes of 120$\mu$, 17$\mu$ and 3$\mu$, respectively.

The thus obtained catalysts of different average particle sizes were used for the hydrotreatment in an autoclave of the same feed oil as in Example 17, under conditions employing a catalyst concentration of 0.2–1.0%, reaction temperature of 420° C., hydrogen pressure for reaction of 140 $kg/cm^2$ and varied reaction time periods, collecting the spent catalysts having coke levels of 30%, 60% and 120%, respectively.

Thereafter, the spent catalysts were each dispersed in a light oil with a boiling point of 250°–340° C. and a sulfur content of 0.8% for hydrotreatment in an autoclave at a temperature of 380° C. and a hydrogen pressure of 140 $kg/cm^2$, measuring the diminishing rate of

| | Results of Experiments of Catalyst Deterioration by Coking (Autoclave, 140 $kg/cm^2$) | | | | | |
|---|---|---|---|---|---|---|
| Experiment No. | Addition Rate of Catalyst (%) | Reaction Temp. (°C.) | Reaction Time (min) | Ratio of Carbonaceous materials to catalyst | Yields of Light oils (%) | |
| | | | | | 350° C.− | 540° C.− |
| 1 | 0.2 | 430 | 60 | 6 | 32 | 73 |
| 2 | 0.06 | 440 | 60 | 21 | 37 | 75 |
| 3 | 0.06 | 440 | 40 | 38 | 49 | 80 |
| (Feed oil) | — | — | — | 0 | 14 | 38 |

In the foregoing experiments, the inner walls of the autoclave were inspected after being washed with a solvent subsequent to the reaction to check the condition of coke deposition. Although slight coke contamination was observed in Experiment 3, almost no contamination was observed in Experiments 1 and 2. This indicates that the contamination of the reactor walls by coke is extremely small until the deposition of carbonaceous materials reaches an amount 20 times greater than that of the fresh catalyst. The so-called coke-up of the reactor takes place if the deposition of the carbonaceous the carbonaceous materials. The results are plotted in the graph of FIG. 14, in which the abscissa represents the average particle size ($\mu$) of the catalyst used and the ordinate the relative decreasing rate of the carbonaceous materials on the catalyst, and curves 1 to 3 show the results of the spent catalysts as the coke levels of 30%, 60% and 120%, respectively. It is seen from FIG. 14 that, with a coke level of 30%, the carbonaceous materials are removed at a sufficient relative speed even from the molded catalyst having a diameter of 1 mm.

However, in order to guarantee dissociation of the carbonaceous materials at a satisfactory speed, it is necessary to apply a catalyst having an average particle size smaller than 120μ in the case of the coke level of 60% and an average particle size smaller than 17μ in the case of the coke level of 120%. Namely, the smaller the particle size of the catalyst, the easier becomes the regenerative hydrotreatment of the spent catalyst. Moreover, in the foregoing experiments, there is a tendency that a catalyst of a greater particle size is less susceptible to the deposition of carbonaceous materials and shows a lower coke level at the same catalyst addition rate and reaction temperature. However, in spite of the lower coke level, a catalyst of a greater particle size causes considerable deposition of carbonaceous materials on the reactor, necessitating to increase the addition rate of the catalyst in order to prevent this trouble.

It is understood from the results of the foregoing experiments that the catalyst with a smaller particle size is more advantageous in the process of the present invention and the easiness of the regenerative hydrotreatment of the spent catalyst is influenced by the coke level and the particle size.

EXAMPLE 19

$Mo(Co)_6$ was vacuum-deposited by the same procedures as in Example 18 on ultra-fine silica particles as used in Example 1 to obtain a catalyst carrying about 3.0% of molybdenum.

The thus prepared catalyst was used for hydrocracking the same ultra-heavy oil as used in Example 1 by the use of a flow-through type reaction system similar to the one illustrated in FIG. 3. Thus, in this experiment, the product oil of the hydrocracking was subjected to atmospheric distillation after gas liquid separation. About 50% of the distillation residual oil which contained the finely particulate catalyst was sent to a fixed bed hydrotreatment system for regeneration, recycling the remaining 50% as such to the hydrocracking system through directly coupled lines 22 and 20 without passing through the solvent deasphalting tower 8. The catalyst concentration at the inlet of the hydrocracking reactor was adjusted to about 0.5% on the basis of fresh catalyst, and the hydrogen pressure and reaction temperature of the reactor were maintained at 140 kg/cm$^2$ and 435° C., respectively. The fixed bed hydrotreatment system was packed with a catalyst produced by the process discribed in Japanese Pat. No. 1039384, i.e. by molding a kneaded mixture of sepiolite and water and supporting cobalt and molybdenum on the moldings, containing about 1.9% of CoO and about 4.8% of $MoO_3$, and having a specific surface area of 170 m$^2$/g, a pore volume of 0.79 cc/g and a particle size of 1/32 inch. The reaction conditions in the fixed bed hydrotreatment system included a hydrogen pressure of 140 kg/cm$^2$, and a temperature of 400° C.

The feed rate of the fresh feed oil became oonstant in about one week after the initiation of the reaction, when the liquid velocity of the hydrocracking reactor was 0.83 Hr$^{-1}$ and the recycling ratio (total feed fresh feed oil) was 1.89. On the other hand, the liquid space velocity of the fixed bed hydrotreatment system was 1.2 Hr$^{-1}$. The carbon content in the solid components (spent catalyst) in the feed material at the inlet of the hydrotreatment system and the carbon content in the catalyst contained in the treated oil were reduced to constant values of about 47% and about 41%, respectively.

The yields of the respective products in the foregoing experiment were as follows.

| | |
|---|---|
| $H_2S$ | 3.45 (%) |
| $C_1$-$C_5$ | 4.99 |
| $C_5$-180° C. fraction | 20.45 |
| 180–350° C. fraction | 72.78 |

In this experiment, when the hydrocracking residue containing the spent catalyst was entirely recycled to the hydrocracking system without partly regenerating same, the coke level of the catalyst increased linearly in proportion to the length of the reaction time, coking up the reactor within a short time period.

EXAMPLE 20

Similarly to Example 19, fine powder of titania catalyst carrying 1.2% of molybdenum was prepared by vacuum-deposition of $Mo(Co)_6$ on titania ($TiO_2$) used in Example 10.

The catalyst was used for hydrocracking the same ultra-heavy oil as in Example 1 in a flow-through type reactor as shown in FIG. 6. As the solid-liquid separator in FIG. 6, an ordinary sedimentation vessel was used to remove coarse particles. On the other hand, a high gradient magnetic separator was employed for the catalyst separator 10, which was not directly connected to the flow-through type reactor of FIG. 6. The product oil from line 14 was temporarily stored and intermittently fed to lines 16 and 17 for supply to a continuous still and a continuous hydrotreating reactor for the spent catalyst, respectively. The residue from the vacuum distillation tower 7 was fed in its entirety to the hydrocracking reactor through line 20, while the vacuum gas oil separated by the vacuum distillation tower was entirely used as the back-wash to the magnetic separator and the oil medium to the hydrotreating device 4.

The high gradient magnetic separator employed a stainless tube which was filled with ferrite type steel wool having a mean diameter of about 12μ as a matrix and located between magnetic poles of a large-sized electromagnet having an interpole gap of 30 mm and a maximum magnetic field of 9000 gauss. By this device, about 30% of the spent catalyst in the product oil which was supplied through line 14 was collected by solid-liquid separation and the magnetically separated spent catalyst was released into the vacuum gas oil as a feed material to be sent to the hydrotreatment. In the solid-liquid separation by the high gradient magnetic separator, there was observed a phenomenon that the separation became easier when the vanadium (VSx) concentration in the spent catalyst in the product oil increased upon lapses of the reaction time. Therefore, the strength of the magnetic field was weakened as the reaction time lapsed thereby to maintain a constant solid-liquid separation rate. Further, the high gradient magnetic separator was tested for the finely particulate catalyst in the feed oil used in Example 19 but it failed, although the spent catalyst in the hydrocracked oil could be easily separated. Thus, in the hydrocracking process according to the present invention, the solid-liquid separation of the spent catalyst in the product oil can be more easily attained by the high gradient magnetic separator particularly in a case where the feed oil has a greater vanadium content.

The hydrotreatment of the spent catalyst which was recovered by the solid-liquid separation was carried out in an ordinary hollow reaction tube, using as the oil medium a vacuum gas oil with a solid concentration of 10-20% under a hydrogen pressure of 180 kg/cm$^2$ at a temperature of 410° C. and with liquid space velocity of about 0.5 Hr$^{-1}$.

With regard to the hydrocracking reactor 1, the catalyst concentration on the ash basis (including the precipitated metals on the catalyst) in the solid content of the feed material was sent at about 3.0%, and the reaction was conducted at a temperature of 440° C. and under a hydrogen pressure of 140 kg/cm$^2$. The feed rate of the fresh feed oil became constant in about one week after initiation of the reaction, when the liquid space velocity was 0.95 Hr$^{-1}$ and the recycling rate was 1.5. The carbon content in the solids at the inlet of the hydro-regenerator 4 for the spent catalyst was 54%, and settled at a constant level of 36% at the outlet thereof.

The yields of the respective products obtained in the foregoing experiments were as follows.

| | |
|---|---|
| H$_2$S | 2.15% |
| C$_1$-C$_5$ | 4.20% |
| C$_5$-180° C. | 11.07% |
| 180° C.-350° C. | 12.22% |
| 350° C.-540° C. | 71.73% |

EXAMPLE 21

The tar sand bitumen as used in Example 4 was hydrocracked substantially in the same manner as in Example 20 except for the omission of recycling of the vacuum residue through line 22. Besides, a solids component containing concentrated iron and vanadium and collected by the high gradient magnetic was reused without adding catalyst to the feed oil. Similarly to Example 20, the high gradient magnetic separator was not directly connected to the flow-through type reactor as shown in FIG. 6.

The reaction conditions of the hydrocracking reactor 1 included a liquid space velocity of 1.0 hr$^{-1}$, a hydrogen pressure of 100 kg/cm$^2$ and a temperature which was 425° C. in the initial stage of the reaction and gradually increased to the level of 440° C. At the temperature of 425° C., the product oil which was obtained by a once-through operation was passed through the high gradient magnetic separator to separate magnetically the fine solids content containing iron and vanadium in condensed state. The composition of the magnetically separated solids content was as follows.

| | |
|---|---|
| Fe | 6.2% |
| V | 1.6% |
| Si | 14.1% |
| Al | 10.5% |
| C | 18.9% |

Thereafter, the solids content of condensed iron and vanadium was dispersed in a vacuum gas oil in a concentration of 10-20% and subjected to a hydrotreatment using a hydrogen pressure of 100 kg/cm$^2$, a temperature of 400° C. and a liquid space velocity of 0.5 Hr$^{-1}$, thereby to dissociate the carbonaceous materials. After sufficiently accumulating the hydrotreated solids content of the condensed iron and vanadium, it was added to the fresh feed material to the hydrocracking reactor 1 so that its solid content was controlled to be 4-5%. After confirming that the major portion of the iron and vanadium condensate which was added to the feed oil was separated by solid-liquid separation with the high gradient magnetic separator, the reaction temperature of the hydrocracking reactor 1 was raised from 425° C. to the level of 440° C. Upon raising the reaction temperature, the iron and vanadium concentrations in the solid components which were separated by the high gradient magnetic separator increased gradually. In view of the increases in solid separation efficiency, the operating conditions of the magnetic separator was adjusted such that the concentration of the iron and vanadium condensates in the feed oil to the hydrocracking reactor 1 became 4-5%.

The yields of the respective product oils obtained in the foregoing experiment after raising the temperature were as follows.

| | |
|---|---|
| IBP-350° C. | 37% |
| 350-540° C. | 38% |
| 540° C.$^+$ residue | 25% |

It will be appreciated from the foregoing results that, according to the process of the present invention, it is possible to convert tar sand bitumen into a light oil substantially without using a catalyst, by separating the iron and vanadium condensates by the high gradient magnetic separator and recycling same to the hydrocracking reactor after hydrogenolytic-decoking.

In the foregoing experiment, the reaction tube was rapidly contaminated with coke when the ash content which was centrifugally separated from the product oil of hydrocracking was recycled as was to the hydrocracking step. Thus, it is an essential requisite in the process of the present invention to separate selectively the iron and vanadium condensates by solid-liquid separation.

INDUSTRIAL APPLICABILITY

The present invention which includes the regenerative hydrotreatment step is free of the problems caused by the increases of the coke level, e.g., the problems of the deterioration of the catalyst and contamination of the reactor, which have thus far been difficult to solve when hydrocracking coal or petroleum hydrocarbons in the presence of a fluidized catalyst. Moreover the process of the invention which regenerates the spent catalyst by a novel hydrotreatment instead of the conventional oxidative roasting, permits easy regeneration of the catalyst and obviates the difficult problems as involved in the catalyst regeneration by oxidative roasting. Thus, the present invention is extremely useful for hydrocracking coal and petroleum hydrocarbons and regenerating the catalysts which are used therefor.

I claim:

1. A residuum conversion process comprising the steps of:
   hydrocracking, in a first zone, a heavy hydrocarbon oil at a temperature of 350°-500° C. and a partial pressure of hydrogen of 10-350 Kg/cm$^2$ in the presence of a first catalyst which is maintained in a fluidized state, which contains at least one hydrogenation-active metal component selected from the group consisting of the metals of Groups Ib, IIb, IIIa, IVa, Va, VIa and VIII, manganese and tin and which has a volume mean particle size of not greater than 50μ wherein toluene insoluble carbonaceous materials are dispoisted on the first catalyst;

discharging at least part of the first catalyst on which toluene-insoluble carbonaceous materials are deposited from said first zone as spent catalyst;

hydrotreating, in a second zone, at least part of the spent catalyst at a temperature of 350°–450° C. and a partial pressure of hydrogen of 30–350 Kg/cm$^2$ in the presence of a liquid hydrocarbon and in the further presence of a second catalyst having an average pore diameter of 20–150 Å, a specific surface area of 50 m$^2$/g or more and a larger bulk volume than said first catalyst and containing at least 5 wt % of one or more metals selected from the group consisting of vanadium, molybdenum, tungsten, nickel, cobalt and copper supported on an acidic carrier, thereby to regenerate the spent catalyst by solubilizing the toluene-insoluble carbonaceous materials deposited thereon; and recycling the regenerated catalyst to said first zone as at least part of said first catalyst.

2. A process as defined in claim 1, wherein said spent catalyst has a coke level of 10–1000%, said coke level being the ratio in percent by weight, of the carbon content in the toluene insoluble carbonaceous materials on the spent catalyst to the roasting residue of the spent catalyst.

3. A process as defined in claim 1, wherein the concentration of the first catalyst in said first zone is in the range of 0.1–30 weight % in terms of the roasting residue of the catalyst.

4. A process as defined in claim 1, wherein said liquid hydrocarbon used in the hydrotreating step in said second zone is at least part of the product oil from the hydrocracking step in said first zone or a hydrotreated oil thereof.

5. A process as defined in claim 1, wherein said liquid hydrocarbon used in the hydrotreating step in said second zone is a fraction of a product oil from the hydrocracking step in said first zone, containing substantially no n-heptane insoluble asphaltenes and having a residual carbon content of no more than 5.0 wt. % and a boiling point of not lower than 200° C., and/or a material obtained by removing a heavy component from said fraction, or their hydrotreated product.

6. A process as defined in claim 1, wherein the volume mean particle sizes of said first and second catalyst are not greater than 10μ, and not smaller than 200μ, respectively.

7. A process as defined in claim 1, wherein said step for hydrocracking the feed hydrocarbons and said step for regenerating said spent catalyst are both carried out under a hydrogen pressure, said regenerative hydrotreatment step employs a partial pressure of hydrogen higher than in said hydrocracking step by at least 20 kg/cm$^2$ and/or a reaction temperature lower than in said hydrocracking step by at least 20° C.

8. A process as defined in claim 1, wherein at least part of said spent catalyst is subjected to the regenerative hydrotreatment after separation from the product oil of said hydrocracking.

9. A process as defined in claim 1, wherein said spent catalyst is separated along with a heavy fraction of the hydrocracked product oil.

10. A process as defined in claim 9, wherein said separation is by distillation.

11. A process as defined in claim 8, wherein said spent catalyst is separated by a solid-liquid separation method.

12. A process as defined in claim 11, wherein said first catalyst is in the form of finely divided particles having a volume mean particle size of 0.1–50μ, and the solid-liquid separation of the spent catalyst from said product oil is effected by means of a high gradient magnetic separator.

13. A process as defined in claim 8, wherein the product oil of hydrocracking is subjected to solid-liquid separation to separate part of the spent catalyst contained therein as a first spent catalyst, and then the remainder of the spent catalyst is separated from the resulting product oil as a second spent catalyst, and at least one of the first spent catalyst and the second spent catalyst is hydrotreated and recycled to said hydrocracking step.

14. A process as defined in claim 1, wherein said acidic carrier is alumina-silica or a product obtained by treating an inorganic oxide carrier with an acid.

15. A process as defined in claim 14, wherein said acid is boric acid, hydrofluoric acid or phosphoric acid.

16. A process as defined in claim 1, wherein at least 5.0 wt % of the spent catalyst extracted from the reaction system is subjected to the hydrotreatment and recycled to said hydrocracking step.

17. A process for hydrocracking heavy petroleum oils, wherein a heavy petroleum oil containing at least 80% of heavy components with a boiling point of 350° C. or higher, at least 200 ppm of soluble metals and no more than 0.1% of insoluble solid components, is hydrocracked in the presence of a fluidized catalyst for converting said heavy oil into a light oil containing at least 30% of a fraction of a boiling point of 350° C. or lower and no more than 20 ppm of soluble metals and being substantially free of n-heptane insoluble asphaltenes, said process being characterized by the steps of:

(a) hydrocracking the above-mentioned feed oil under a partial pressure of hydrogen of 30–250 kg/cm$^2$ and at a temperature of 400°–480° C., using, as the fluidized catalyst, a first finely particulate catalyst having a volume means particle size of 0.1–50μ in a concentration of 0.1–5 wt %, said first catalyst containing at least one hydrogenation-active component selected from the group consisting of metals of Groups Ib, IIb, IIIa, Va, IVa, VIa and VIII, maganese and tin;

(b) separating at least 10% of spent catalyst contained in the product oil of said hydrocracking by solid-liquid separation;

(c) separating the product oil containing the remainder of the spent catalyst into a light oil substantially free of the spent catalyst and a heavy oil containing the spent catalyst;

(d) dispersing at least part of the spent catalyst separated in step (b) in the light oil separated in step (c) having a boiling point of at least 200° C. or a hydrotreated oil thereof, subjecting the dispersed spent catalyst to a hydrotreatment under a hydrogen pressure of 30–250 kg/cm$^2$ and at a temperature of 350°–450° C. to solubilize at least part of insoluble carbonaceous materials in said spent catalyst thereby to regenerate said spent catalyst, said hydrogeneration being performed in the pressure of a second catalyst having an average pore diameter of 20–150 Å, a specific surface area of 50 m$^2$/g or more and a larger bulk volume than said first catalyst and containing at least 5 wt % of one or more metals selected from the group consisting of vanadium, molybdenum, tungsten, nickel, cobalt, copper and composited with an acidic carrier; and (e) recycling said light oil containing the regenerated catalyst to step (a), if necessary along with at least part of the heavy oil obtained in step (c).

18. A process as defined in claim 17, wherein at least 70% of the spent catalyst is separated in step (b) and sent to step (d) for the regenerative hydrotreatment.

19. A process as defined in claim 18, wherein a high gradient magnetic separation method is used for said solid-liquid separation.

20. A process as defined in claim 19, wherein said first catalyst in step (a) has a volume mean particle size of 1-20μ.

21. A process as defined in any one of claim 17 to 20, wherein a fraction of a boiling point of 550° C. or lower is separated in step (c).

22. A process for hydrocrcking heavy hydrocarbon oils containing insoluble solids whereby tar sand bitumen or oil tar with an insoluble solid content of at least 0.2%, or a residue separated therefrom is hydrocracked in the presence of a fluidized catalyst, said process comprising the steps of:

(a) hydrocracking the feed oil using, as the fluidized catalyst, a first catalyst under a hydrogen pressure of 30-250 kg/cm$^2$ and a temperature fo 400°-480° C., said first catalyst containing at least one hydrogenation-active metal component selected from the group consisting of the metals of Groups Ib, IIb, IIIa, IVa, Va, VIa and VIII, manganese and tin and which has a volume mean particle size of not greater than 50μ;

(b) subjecting the product oil of the hydrocracking to a high gradient magnetic separation to effect separation of magnetizable solids composed of insoluble solid components with high iron and vanadium contents from the product oil;

(c) separating from said product oil a light oil fraction substantially free of insoluble solids;

(d) dispersing at least part of said solids separated in step (b) in the light oil obtained in step (c) and having a boiling point of at least 200° C. or a hydrotreated oil thereof, the resulting dispersion being subjected to a hydrotreatment in the presence of a second catalyst under a hydrogen pressure of 30-250 kg/cm$^2$ and at a temperature of 350°-450° C. for solubilizing the carbonaceous materials deposited on said solids, said second catalyst having an average pore diameter of 20-150 Å, a specific surface area of 50 m$^2$/g or more and a larger bulk volume than said first catalyst and containing at least 5 wt % of one or more metals selected from the group consisting of vanadium, molybdenum, tungsten, nickel, cobalt and copper and composited with an acidic carrier;

(e) recycling the thus hydrotreated solids so as to serve as the catalyst in step (a).

23. A process as defined in claim 22, wherein said hydrotreated solids recycled from step (e) to (a) are contained in a concentration of 1-10% in the entire heavy oil to be fed to step (a).

24. A residuum conversion process comprising the steps of:

(a) hydrocracking, in a first zone, a heavy hydrocarbon oil at a temperature of 350°-500° C. and a partial pressure of hydrogen of 10-350 Kg/cm$^2$ in the presence of a first catalyst which is maintained in a fluidized state, which contains at least one hydrogenation-active metal component selected from the group consisting of the metals of Groups Ib, IIb, IIIa, IVa, Va, VIa and VIII, manganese and tin and which has a volume mean particle size of not greater than 10μ wherein toluene insoluble carbonaceous materials are deposited on the first catalyst;

(b) subjecting the product oil from step (b) to solid-liquid separation to remove part of the first catalyst on which toluene-insoluble carbonaceous materials are deposited as a first spent catalyst;

(c) subjecting the product oil from step (b) containing the remaining part of the first catalyst on which toluene-insoluble carbonaceous materials are deposited to a high gradient magnetic separation to obtain a magneto-sensitive spent catalyst and a product oil containing a non-magneto-sensitive spent catalyst;

(d) hydrotreating each of said magneto-sensitive spent catalyst and said product oil containing a non-magneto-sensitive spent catalyst at a temperature of 350°-450° C. and a partial pressure of hydrogen of 30-350 Kg/cm$^2$ in the presence of a liquid hydrocarbon and in the further presence of a second catalyst having an average pore diameter of 20-150 Å, a specific surface area of 50 m$^2$/g or more and a larger bulk volume than said first catalyst and containing at least 5 wt % of one or more metals selected from the group consisting of vanadium, molybdenum, tungsten, nickel, cobalt and copper and supported on an acidic carrier, said liquid hydrocarbon used in hydrotreating the magneto-sensitive spent catalyst being a product oil fraction having a boiling point of at least 200° C. and containing substantially no n-heptane insoluble asphaltenes, to regenerate each of the magneto-sensitive spent catalyst and the non-magneto-sensitive spent catalyst by solubilizing the toluene-insoluble carbonaceous matters deposited thereon; and (e) recycling each of said regenerated magneto-sensitive spent catalyst and said non-magneto-sensitive spent catalyst to said first zone as at least part of said first catalyst.

* * * * *